(12) United States Patent
Ben-Ari et al.

(10) Patent No.: US 11,949,623 B2
(45) Date of Patent: Apr. 2, 2024

(54) TECHNIQUES TO FACILITATE LTE CV2X AUTONOMOUS SYNCHRONIZATION

(71) Applicant: QUALCOMM Incorporated, San Diego, CA (US)

(72) Inventors: Moshe Ben-Ari, Rehovot (IL); Peer Berger, Hod Hasharon (IL); Cheol Hee Park, San Diego, CA (US); Ashish Shankar Iyer, San Diego, CA (US); Assaf Touboul, Netanya (IL); Guy Spiegelstein, Nes-Ziona (IL); Sivaramakrishna Veerepalli, San Diego, CA (US); Soumya Das, San Diego, CA (US); Alok Sharma, San Diego, CA (US); Sean Vincent Maschue, Encinitas, CA (US); Narasimha Rao Koramutla, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 17/648,922

(22) Filed: Jan. 25, 2022

(65) Prior Publication Data
US 2023/0239102 A1 Jul. 27, 2023

(51) Int. Cl.
*H04L 5/00* (2006.01)
(52) U.S. Cl.
CPC .......... *H04L 5/0051* (2013.01); *H04L 5/0053* (2013.01)

(58) Field of Classification Search
CPC ............................ H04L 5/0051; H04L 5/0053
See application file for complete search history.

(56) References Cited

U.S. PATENT DOCUMENTS

2021/0352686 A1 11/2021 Park et al.
2021/0377893 A1* 12/2021 Khoryaev ............. H04L 5/0053

FOREIGN PATENT DOCUMENTS

CN 113141594 B 10/2022
WO 2020205990 A1 10/2020

OTHER PUBLICATIONS

International Search Report and Written Opinion—PCT/US2023/010389—ISA/EPO—dated Apr. 18, 2023.

* cited by examiner

*Primary Examiner* — Ronald B Abelson
(74) *Attorney, Agent, or Firm* — Procopio, Cory, Hargreaves & Savitch

(57) ABSTRACT

Apparatus, methods, and computer-readable media for facilitating autonomous synchronization are disclosed herein. For example, a UE may be configured to perform an initial synchronization directly to PSCCH and PSSCH when other synchronization sources, such as GNSS, a base station, and/or SLSS, are unavailable. An example method for wireless communication at a user equipment includes receiving a PSCCH. The example method also includes performing an initial synchronization based on the PSCCH. In some examples, the method may also include receiving a PSSCH, and determining a logical subframe number modulo 10 based on the PSSCH. The logical subframe number modulo 10 may correspond to a sequence seed.

27 Claims, 13 Drawing Sheets

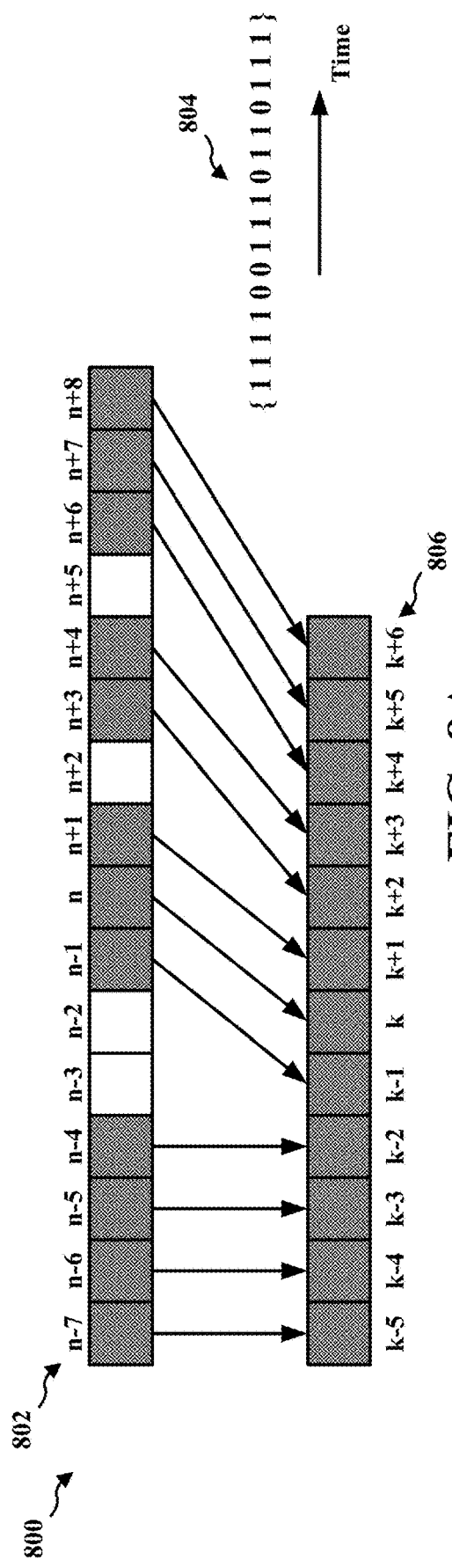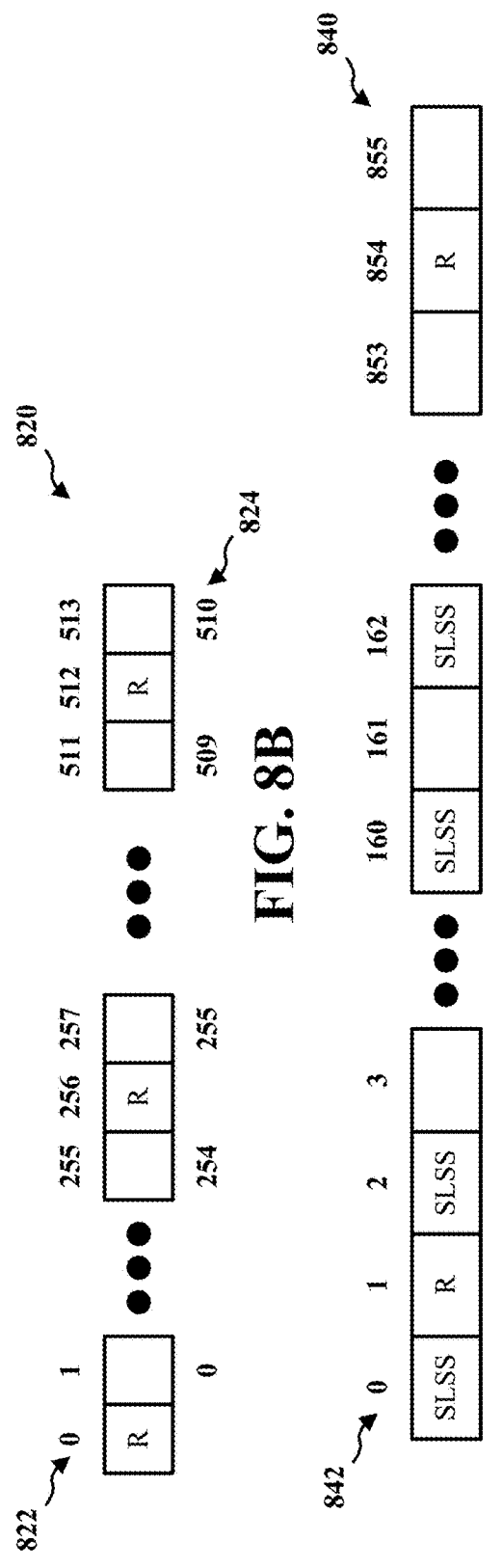
FIG. 8A
FIG. 8B
FIG. 8C

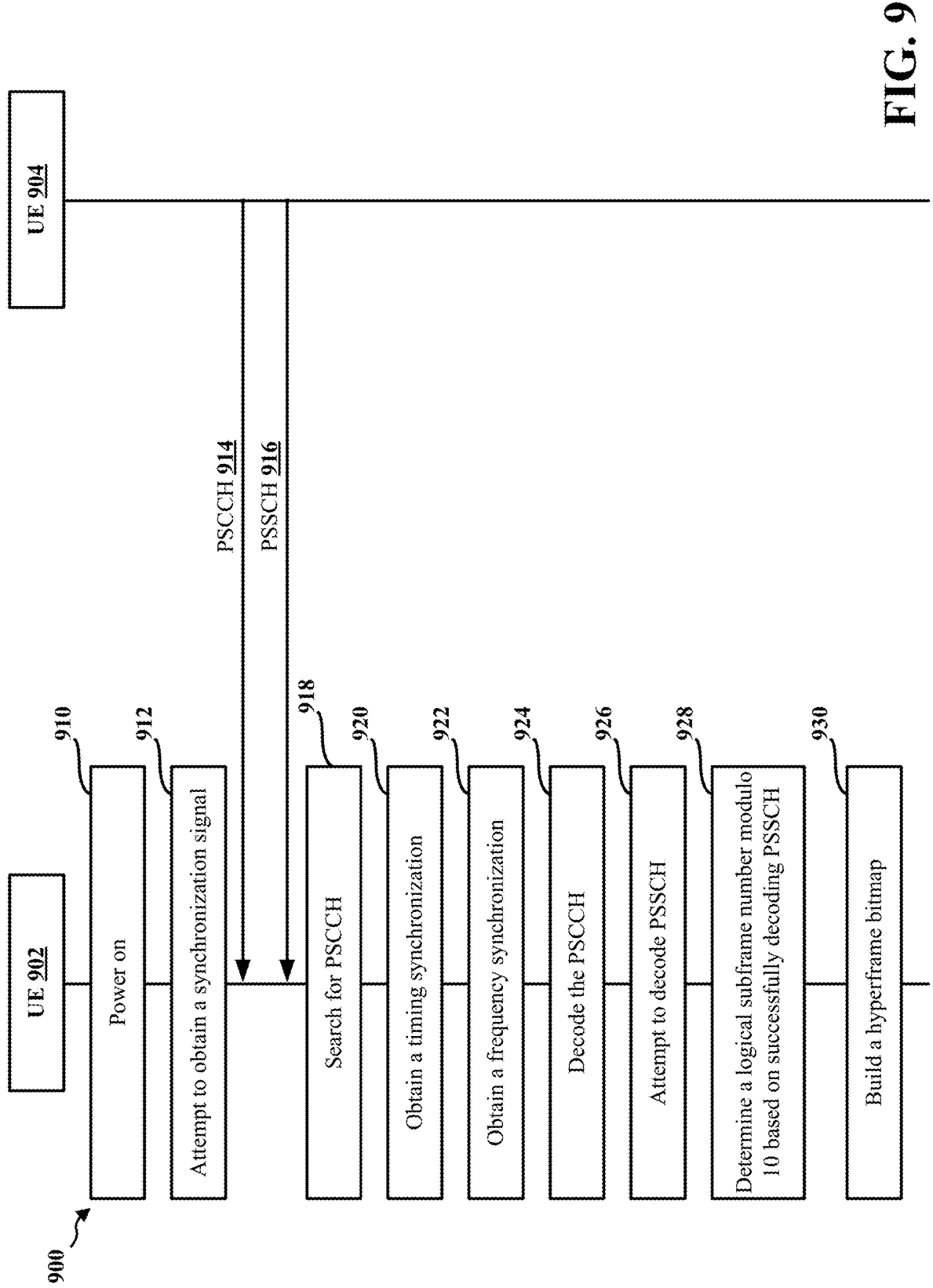

TECHNIQUES TO FACILITATE LTE CV2X AUTONOMOUS SYNCHRONIZATION

TECHNICAL FIELD

The present disclosure relates generally to communication systems, and more particularly, to sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). An example apparatus may receive a physical sidelink control channel (PSCCH). The example apparatus may also perform an initial synchronization based on the PSCCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8A illustrates resources of a portion of hyperframe, in accordance with the teachings disclosed herein.

FIG. 8B illustrates a sequence of subframes including reserved subframes, in accordance with the teachings disclosed herein.

FIG. 8C illustrates a sequence of subframes including sidelink synchronization signal (SLSS) subframes and reserved subframes, in accordance with the teachings disclosed herein.

FIG. 9 is an example communication flow between a first UE and a second UE, in accordance with the teachings disclosed herein.

DETAILED DESCRIPTION

Figure 1:
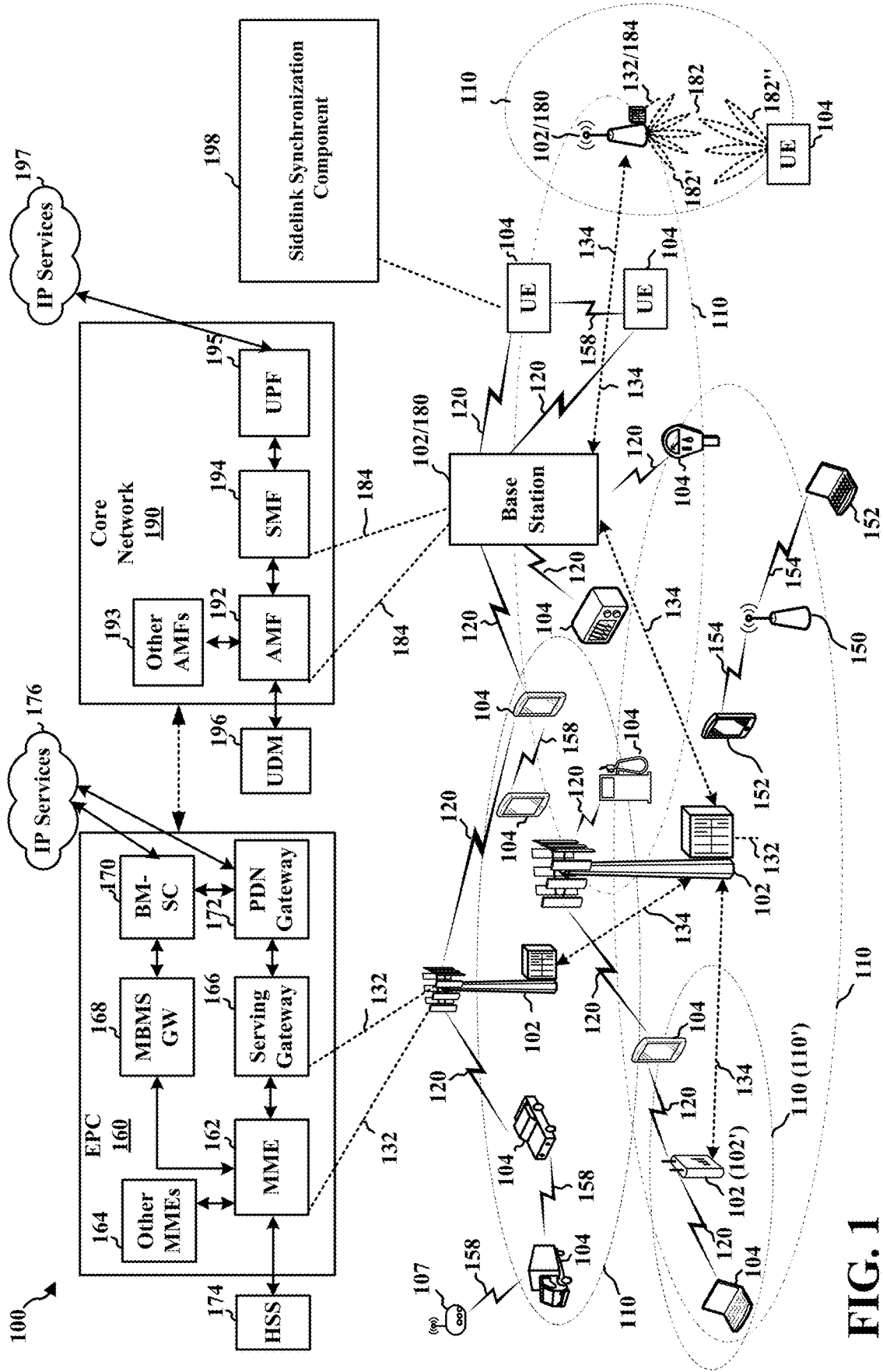
FIG. 1 is a diagram illustrating an example of a wireless communications system and an access network.

Wireless communication facilitates real-time information sharing through different communications. A vehicle including a UE may use uplink, downlink, and/or sidelink to exchange information on their status with other nearby vehicles (vehicle-to-vehicle (V2V)), infrastructure nodes (vehicle-to-infrastructure (V2I)), and/or pedestrians (vehicle-to-pedestrians (V2P)), which can be collectively referred to as vehicle-to-anything (V2X) communications. In some examples, V2X communications may be based on cellular (CV2X) communications, such as LTE.

In some examples, CV2X communications may facilitate transferring safety messages between cars and roadside units (RSUs). For example, a vehicle UE may transmit a basic safety message (BSM) or a cooperative awareness message (CAM) periodically to broadcast information about the vehicle, such as a heading, speed, position, latitude/longitude, etc. In some examples, a vehicle UE may transmit a decentralized environmental notification message (DENM) that may include one or more different messages depending on the cause of their transmission, such as imminent collision, sudden braking, detection of a traffic jam, etc. Thus, a vehicle UE employing V2X communications, such as CV2X communications, may serve as an additional safety sensor for vehicles.

Synchronization allows UEs to have a common view from the time domain. The common view allows the UEs to access the medium based on a synchronized clock. Without being synchronized, a UE may not be able to receive messages, which renders the safety sensor disabled. There are different sources of synchronization that a UE may use. For example, a UE may derive its synchronization based on a Global Navigation Satellite System (GNSS) transmitting a GNSS signal or based on a base station transmitting a synchronization signal block (SSB). In some examples, a UE deriving its own synchronization from a GNSS or a base station may be configured (e.g., by the network) to transmit a sidelink synchronization signal (SLSS) on a synchronization carrier. A UE transmitting an SLSS may be referred to as a "SyncRef UE."

However, in some examples, a synchronization source may unavailable to a UE (e.g., a vehicle UE). For example, a GNSS signal may be unavailable to the UE when the UE is located in a tunnel, is located underground (e.g., in an underground parking garage), or may malfunction. A base station SSB may be unavailable to a UE when the UE is out-of-coverage of a base station. Additionally, SLSS-based synchronization may be unavailable to a UE as SLSS transmission and reception may be optional and, thus, may not be configured for the UE to receive the SLSS or a nearby UE may not be configured to transmit the SLSS.

In some examples, a UE may be able to maintain synchronization after a synchronization source becomes unavailable. For example, once synchronized via a synchronization source, the UE may maintain their synchronization for a period based on regular reception of sidelink control channel (PSSCH)/sidelink shared channel (PSSCH). However, timing resources and/or frequency resources may drift over time and, thus, the UE may become unsynchronized and transition to an offline mode. In such examples, the UE may wait to synchronize with a GNSS signal, a base station SSB, or an SLSS before transitioning to an online mode. In other examples, a UE performing a "cold bootup" (e.g., a UE being powered on without any synchronization information at the time of wake-up) may wait to transition to an online mode until a GNSS signal, a base station SSB, or an SLSS is available.

Aspects disclosed herein provide techniques for performing an initial synchronization directly to PSCCH/PSSCH (e.g., to perform an autonomous synchronization). Performing such an autonomous synchronization may be beneficial when, for example, a synchronization source, such as a GNSS signal, a base station SSB, and/or an SLSS, is unavailable. As disclosed herein, the PSCCH/PSSCH may allow the UE to establish a synced status and also to maintain the synced status. Thus, disclosed techniques enable the UE to continue transmitting/receiving sidelink communications (e.g., PSCCH messages and/or PSSCH messages) and, thereby, enable the UE to continue serving as an additional safety sensor in different conditions (e.g., when a synchronization source (e.g., a GNSS signal, a base station SSB, or an SLSS) is unavailable for the initial synchronization, such as a "cold bootup," or when trying to maintain the synced status when the synchronization source later becomes unavailable. It may be appreciated that SLSS may be unavailable when SLSS reception/transmission is not configured at the UE and/or at nearby UEs, or may be available when SLSS is configured but the UE is unable to successfully receive the SLSS.

Aspects disclosed herein facilitate performing the initial synchronization directly to the PSCCH/PSSCH based on performing a timing and frequency synchronization (e.g., a first phase) and performing a logical subframe number synchronization (e.g., a second phase). Disclosed techniques may use received PSCCH to perform the timing and frequency synchronization. Additionally, disclosed techniques may use received PSSCH to perform the logical subframe number synchronization.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (CV2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 4. Although the following description, including the example slot structure of FIG. 4, may provide examples for sidelink communication in connection with 5G NR, the concepts described herein may be applicable to other similar areas, such as LTE, LTE-A, CDMA, GSM, and other wireless technologies.

Referring again to FIG. 1, in some aspects, a device in communication with a base station, such as a UE 104, may be configured to manage one or more aspects of wireless communication by facilitating autonomous synchronization. For example, the UE 104 may include a sidelink synchronization component 198 configured to receive a PSCCH. The example sidelink synchronization component 198 may also be configured to perform an initial synchronization based on the PSCCH.

The aspects presented herein may enable a UE to perform an initial synchronization directly to PSCCH and PSSCH, which may facilitate improving communication performance, for example, by enabling the UE to synchronize when other synchronization sources, such as GNSS, a base station, and/or SLSS, are unavailable.

Although the following description provides examples directed to LTE (and, in particular, to synchronization of CV2X), the concepts described herein may be applicable to other wireless technologies in which a UE may communicate via sidelink.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
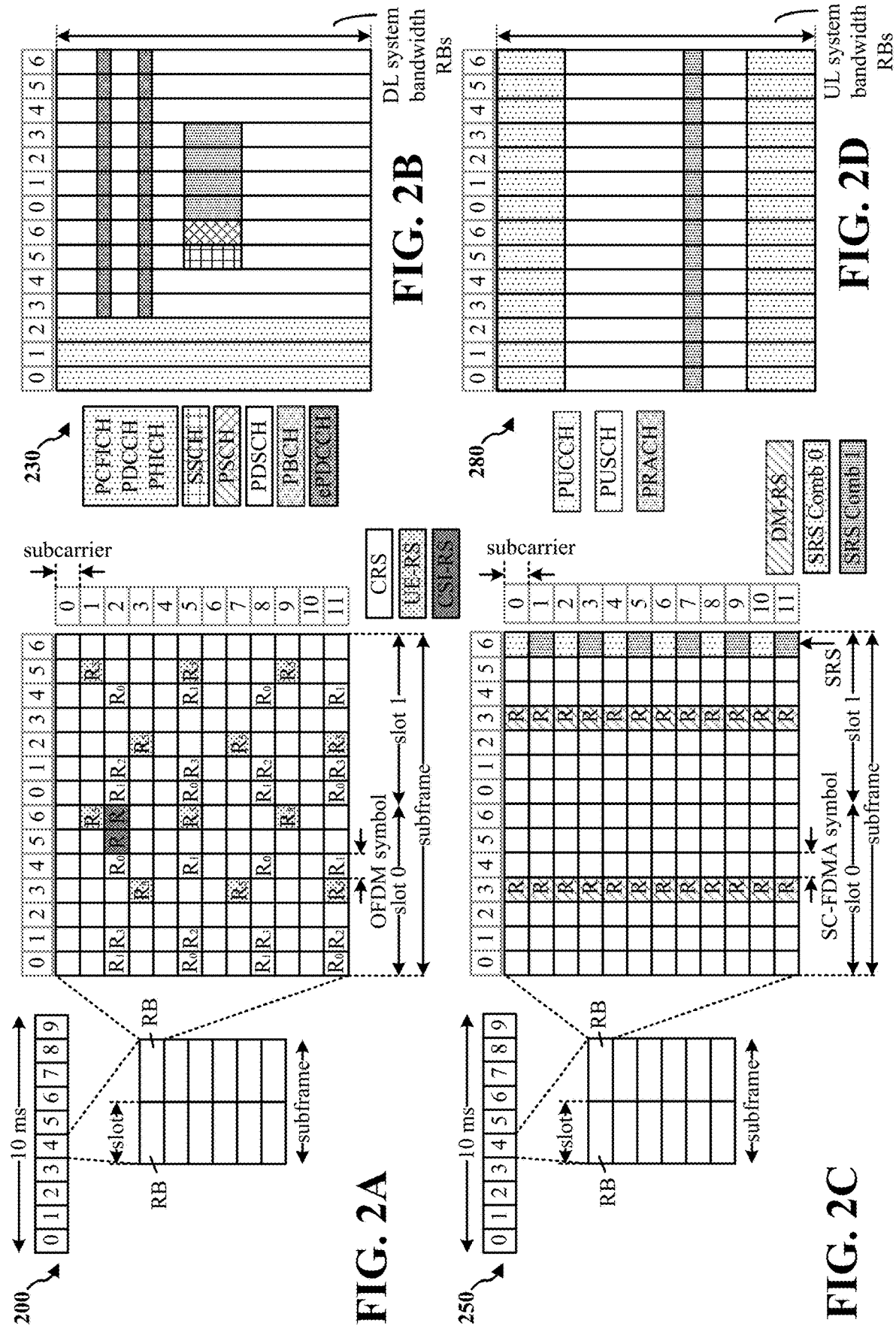
FIG. 2A is a diagram illustrating LTE examples of a DL frame structure.
FIG. 2B is a diagram illustrating LTE examples of DL channels within the DL frame structure of FIG. 2A.
FIG. 2C is a diagram illustrating LTE examples of an UL frame structure.
FIG. 2D is a diagram illustrating LTE examples of UL channels within the UL frame structure of FIG. 2C.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common R5), UE-specific reference signals (UE-RS), and channel state information reference signals (CSI-RS). FIG. 2A illustrates CRS for antenna ports 0, 1, 2, and 3 (indicated as R0, R1, R2, and R3, respectively), UE-RS for antenna port 5 (indicated as R5), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
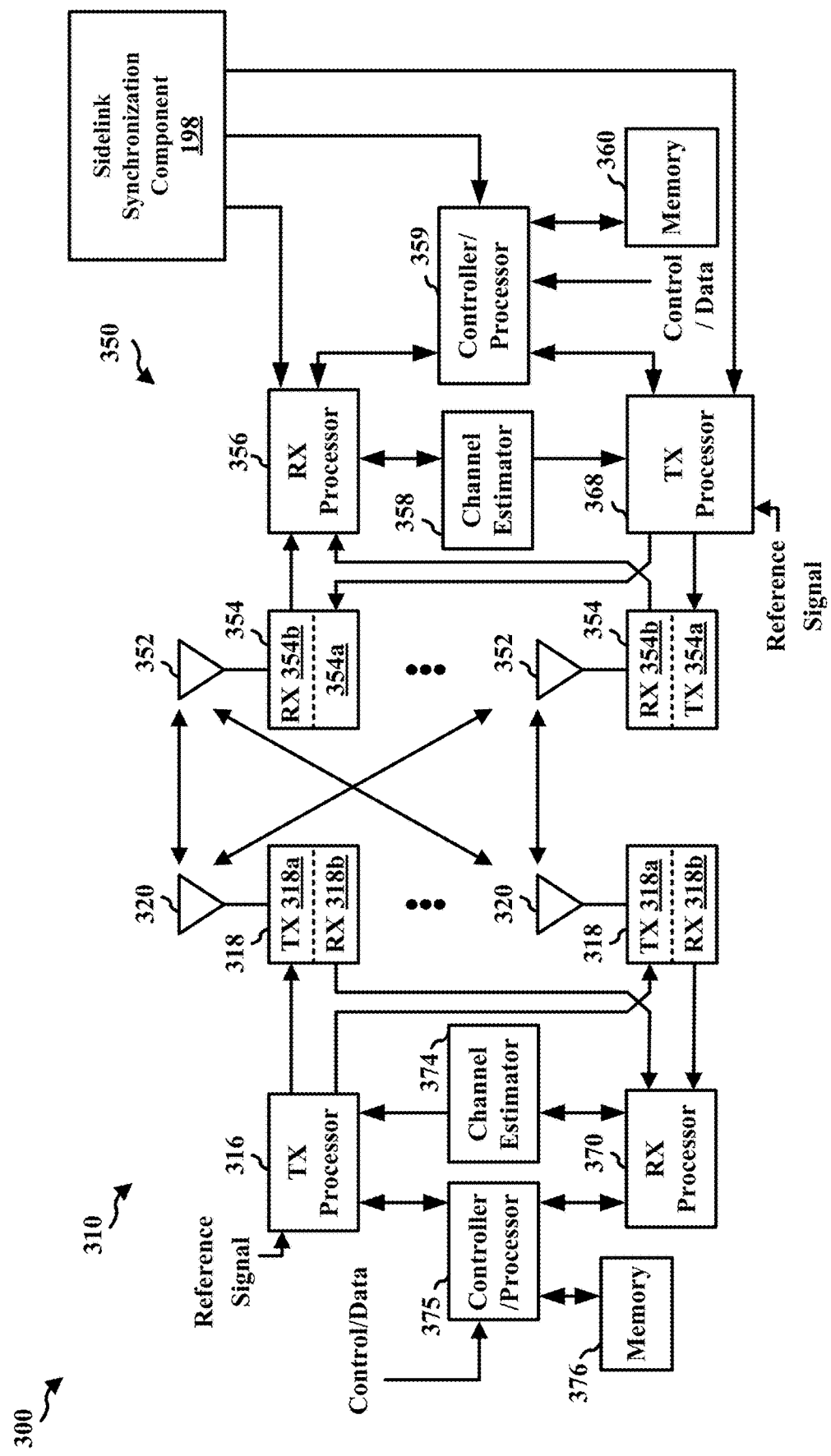
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350. The communication may be based on sidelink or an access link. In some examples, the first wireless communication device 310 and the second wireless communication device 350 may communicate based on V2X or other D2D communication. In other aspects, the first wireless communication device 310 and the second wireless communication device 350 may communicate over an access link based on uplink and downlink transmissions. The communication may be based on sidelink using a PC5 interface (e.g., between two UEs). The communication may be based on an access link using a Uu interface (e.g., between a base station and a UE). The first wireless communication device 310 and the second wireless communication device 350 may comprise a UE, an RSU, a base station, etc. In some implementations, the first wireless communication device 310 may correspond to a base station and the second wireless communication device 350 may correspond to a UE.

As shown in FIG. 3, the first wireless communication device 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example second wireless communication device 350 includes antennas 352, a transceiver 354 including a transmitter 354a and a receiver 354b, an RX processor 356, a channel estimator 358, a controller/processor 359, memory 360, and a TX processor 368. In other examples, the first wireless communication device 310 and/or the second wireless communication device 350 may include additional or alternative components.

Packets may be provided to the controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the second wireless communication device 350. Each spatial stream may then be provided to a different antenna 320 via a separate transmitter 318a. Each transmitter 318a may modulate a radio frequency (RF) carrier with a respective spatial stream for transmission.

At the second wireless communication device 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the second wireless communication device 350. If multiple spatial streams are destined for the second wireless communication device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the first wireless communication device 310. These soft decisions may be based on channel estimates computed by the channel estimator 358. The soft decisions are then decoded and deinterleaved to recover the data and control signals that were originally transmitted by the first wireless communication device 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by the first wireless communication device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the first wireless communication device 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The transmission is processed at the first wireless communication device 310 in a manner similar to that described in connection with the receiver function at the second wireless communication device 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the sidelink synchronization component 198 of FIG. 1.

Figure 4:
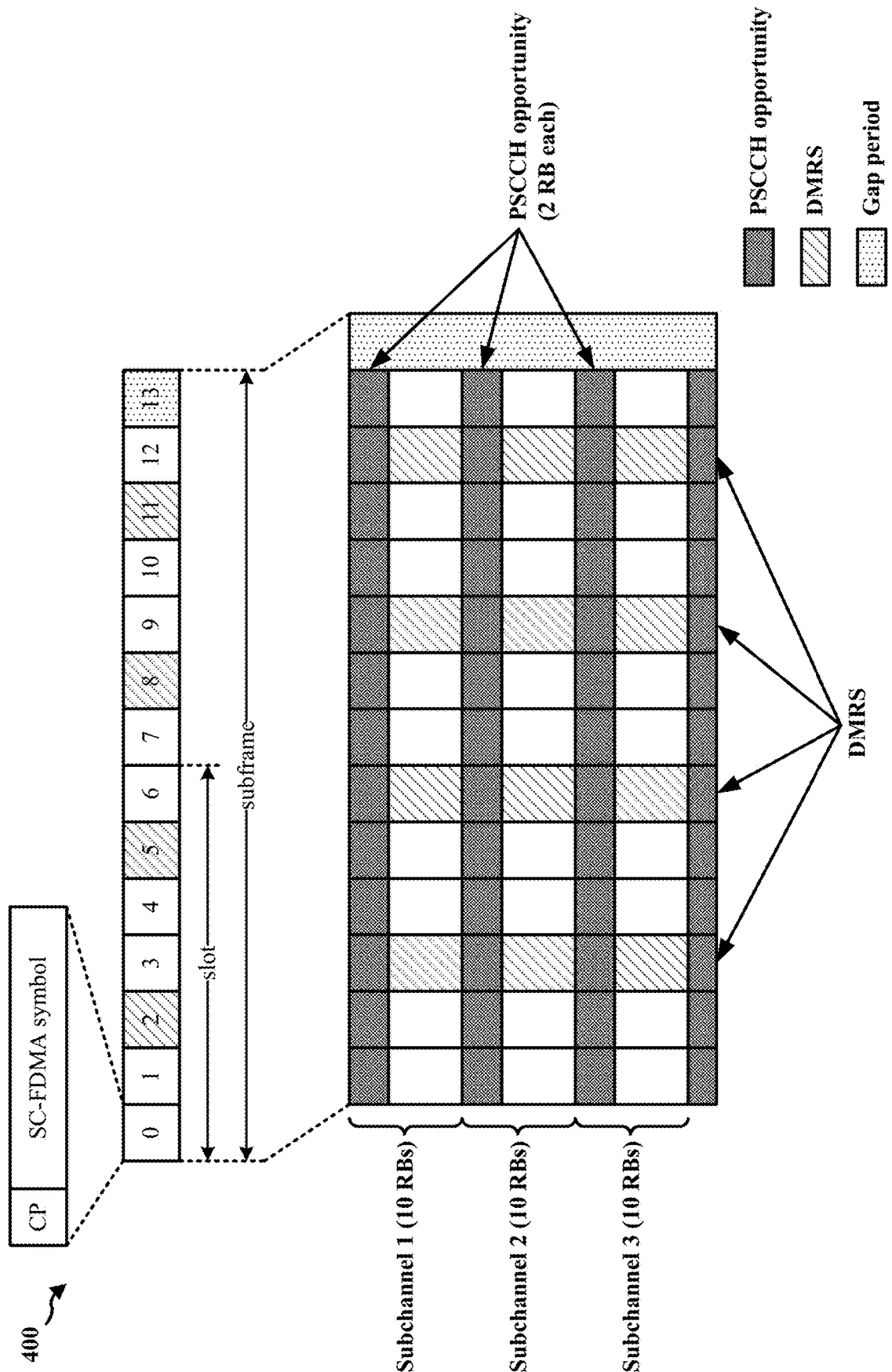
FIG. 4 is a diagram illustrating an example of an LTE cellular vehicle-to-everything (CV2X) subframe.

FIG. 4 is a diagram 400 that illustrates one example aspect of a subframe configured for LTE CV2X communication. For example, the subframe may be a sidelink subframe having a duration of 1 ms. In some aspects, each subframe may include fourteen transmission time intervals (TTIs). In some further aspects, each subframe may include two slots of seven TTIs each. However, different configurations may be possible, for example, based on different numerologies. Within each TTI of the subframe, a CP may be followed by a single-carrier frequency division multiple access (SC-FDMA) symbol. However, the last TTI may be configured as gap or guard period, which may allow switching between transmission and reception.

In the illustrated example of FIG. 4, a subset of the RBs may carry DMRSs, e.g., for channel estimation at another UE configured for CV2X communication. With CV2X communication, DMRS extension may be configured to address relatively greater Doppler shifts. Each DMRS may be carried on all or some of the available subchannels over the TTIs configured to carry a DMRS. According to one configuration, four DMRSs may be included in the subframe: the first DMRS in the third TTI (e.g., symbol index 2), the second DMRS in the sixth TTI (e.g., symbol index 5), the third DMRS in the ninth TTI (e.g., symbol index 8), and the fourth DMRS in the twelfth TTI (e.g., symbol index 11). However, other DMRS configurations may be possible.

The subframe may be divided into a set of subchannels including a quantity of RBs, such as 5 RBs, 10 RB, etc. In the illustrated example of FIG. 4, each subchannel includes 10 RBs. While three subchannels are illustrated in the diagram 400, different numbers of subchannels, potentially spanning different numbers of RBs, may be possible in other configurations. In each subchannel over each TTI, a PSCCH opportunity may occur. For example, the PSCCH may be carried on two RBs of each subchannel over each TTI. RBs that are not allocated for the DMRS or the gap period, and that do not carry the PSCCH, may carry data. The data may be on a PSSCH or other sidelink channel.

Figure 5:
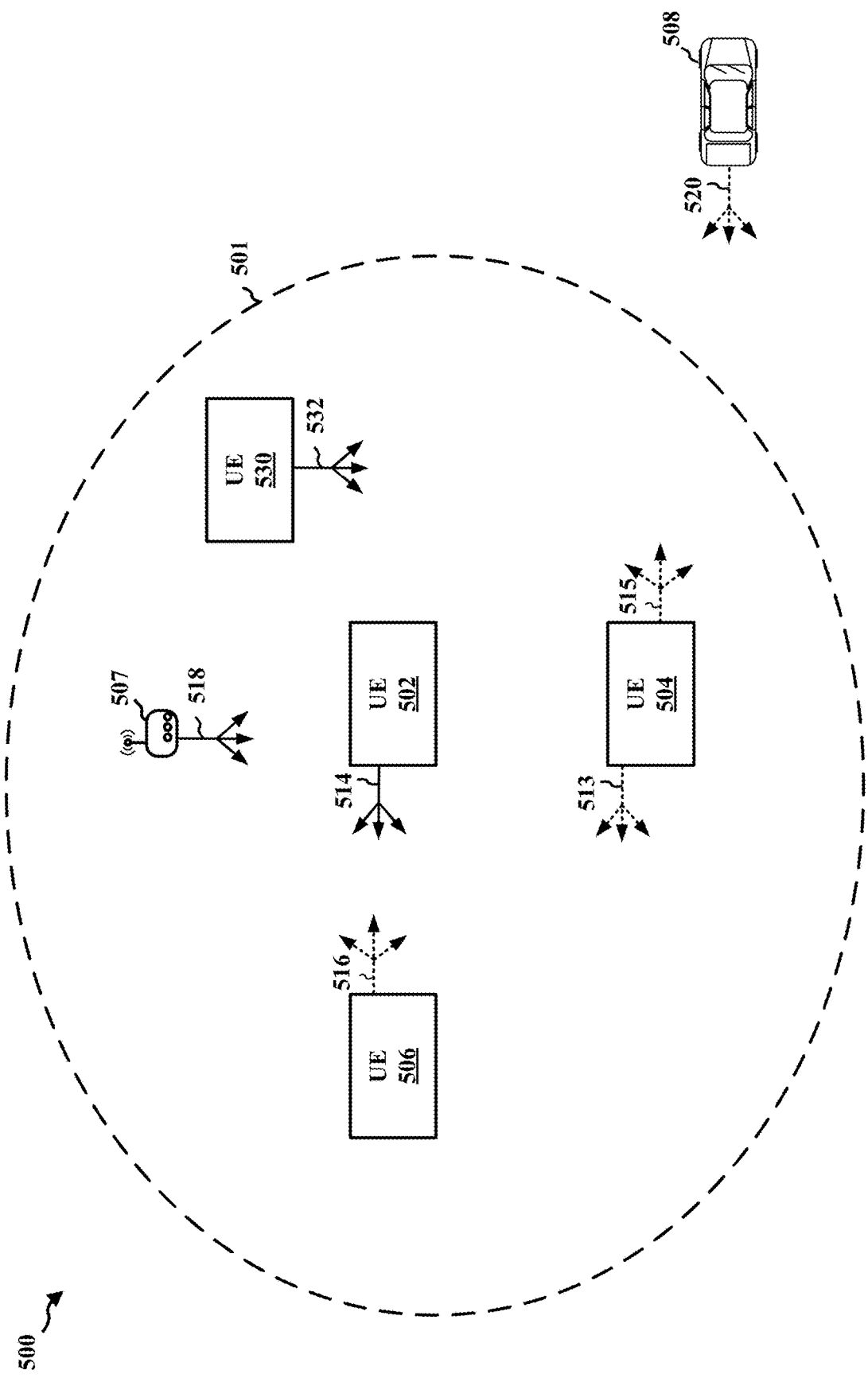
FIG. 5 illustrates example aspects of sidelink communication between devices, in accordance with aspects presented herein.

FIG. 5 illustrates an example 500 of sidelink communication between devices, as presented herein. The communication may be based on a slot structure comprising aspects described in connection with FIG. 4 or another sidelink structure. For example, a first UE 502 may transmit a sidelink transmission 514, e.g., comprising a control channel (e.g., PSCCH) and/or a corresponding data channel (e.g., PSSCH), that may be received by a second UE 504, a third UE 506, and/or a fourth UE 508. The sidelink transmission 514 may be received directly from the first UE 502, e.g., without being transmitting through a base station. Additionally, or alternatively, an RSU 507 may receive communication from and/or transmit communication to the first UE 502, the second UE 504, the third UE 506, and/or the fourth UE 508. As shown in FIG. 5, the RSU 507 may transmit a sidelink transmission 518 that is received directly from the RSU 507.

The first UE 502, the second UE 504, the third UE 506, the fourth UE 508, and/or the RSU 507 may each be capable of operating as a transmitting device in addition to operating as a receiving device. Thus, the second UE 504 is illustrated as transmitting a second sidelink transmission 513 and a third sidelink transmission 515, the third UE 506 is illustrated as transmitting a fourth sidelink transmission 516, and the fourth UE 508 is illustrated as transmitting a fifth sidelink transmission 520. One or more of the transmissions may be broadcast to nearby devices. For example, the first UE 502 may transmit communication intended for receipt by other UEs within a range 501 of the first UE 502.

A sidelink transmission may provide sidelink control information (SCI) including information to facilitate decoding the corresponding data channel. In some examples, the SCI may also include information that a receiving device may use to avoid interference. For example, the SCI may indicate reserved time resources and/or reserved frequency resources that will be occupied by the data transmission, and may be indicated in a control message from the transmitting device.

One or more of the first UE 502, the second UE 504, the third UE 506, the fourth UE 508, and/or the RSU 507 may include a sidelink synchronization component, similar to the sidelink synchronization component 198 described in connection with FIG. 1.

Sidelink communication may be based on different types or modes of resource allocation mechanisms. In a first resource allocation mode, centralized resource allocation may be provided by a network entity. For example, and referring to the example of FIG. 1, a base station 102/180 may determine resources for sidelink communication and may allocate resources to different UEs 104 to use for sidelink transmissions. In this first resource allocation mode, a UE receives the allocation of sidelink resources from the base station 102/180. In a second resource allocation mode, distributed resource allocation may be provided. In the second resource allocation mode, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots.

Thus, in the second resource allocation mode, individual UEs may autonomously select resources for sidelink transmission, for example, without a central entity, such as a base station, indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for the second resource allocation mode, the UE may determine (e.g., sense) whether a selected sidelink resource has been reserved by other UE(s) before selecting the sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding SCI transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., subchannels per subframe) reserved by the UE may depend on the size of data to be transmitted by the UE. Although the example is described for a UE receiving reservations from another UE, the reservations may also be received from an RSU or other device communicating based on sidelink.

Wireless communication facilitates real-time information sharing through different communications. A vehicle including a UE may use uplink, downlink, and/or sidelink to exchange information on their status with other nearby vehicles (V2V), infrastructure nodes (V2I), and/or pedestrians (V2P), which can be collectively referred to as V2X communications. In some examples, V2X communications may be based on CV2X communications, such as LTE.

In some examples, CV2X communications may facilitate transferring safety messages between cars and RSUs. For example, a vehicle UE may transmit a BSM or a CAM periodically to broadcast information about the vehicle, such as a heading, speed, position, latitude/longitude, etc. In some examples, a vehicle UE may transmit a DENM that may include one or more different messages depending on the cause of their transmission, such as imminent collision, sudden braking, detection of a traffic jam, etc. Thus, a vehicle UE employing V2X communications, such as CV2X communications, may serve as an additional safety sensor for vehicles.

Synchronization allows UEs to have a common view from the time domain. The common view allows the UEs to access the medium based on a synchronized clock. Without being synchronized, a UE may not be able to receive messages, which renders the safety sensor disabled. There are different sources of synchronization that a UE may use. For example, a UE may derive its synchronization based on a GNSS transmitting a GNSS signal or based on a base station transmitting a SSB. In some examples, a UE deriving its own synchronization from a GNSS or a base station may be configured (e.g., by the network) to transmit a SLSS on a synchronization carrier. A UE transmitting an SLSS may be referred to as a "SyncRef UE."

However, in some examples, a synchronization source may be unavailable to a UE (e.g., a vehicle UE). For example, a GNSS signal may be unavailable to the UE when the UE is located in a tunnel, is located underground (e.g., in an underground parking garage), or may malfunction. A base station SSB may be unavailable to a UE when the UE is out-of-coverage of a base station. Additionally, SLSS-based synchronization may be unavailable to a UE as SLSS transmission and reception may be optional and, thus, may not be configured for the UE to receive the SLSS or a nearby UE may not be configured to transmit the SLSS.

In some examples, a UE may be able to maintain synchronization after a synchronization source becomes unavailable. For example, once synchronized via a synchronization source, the UE may maintain their synchronization for a period based on regular reception of PSSCH/PSSCH. However, timing resources and/or frequency resources may drift over time and, thus, the UE may become unsynchronized and transition to an offline mode. In such examples, the UE may wait to synchronize with a GNSS signal, a base station SSB, or an SLSS before transitioning to an online mode. In other examples, a UE performing a "cold bootup" (e.g., a UE being powered on without any synchronization information at the time of wake-up) may wait to transition to an online mode until a GNSS signal, a base station SSB, or an SLSS is available.

Figure 6B:
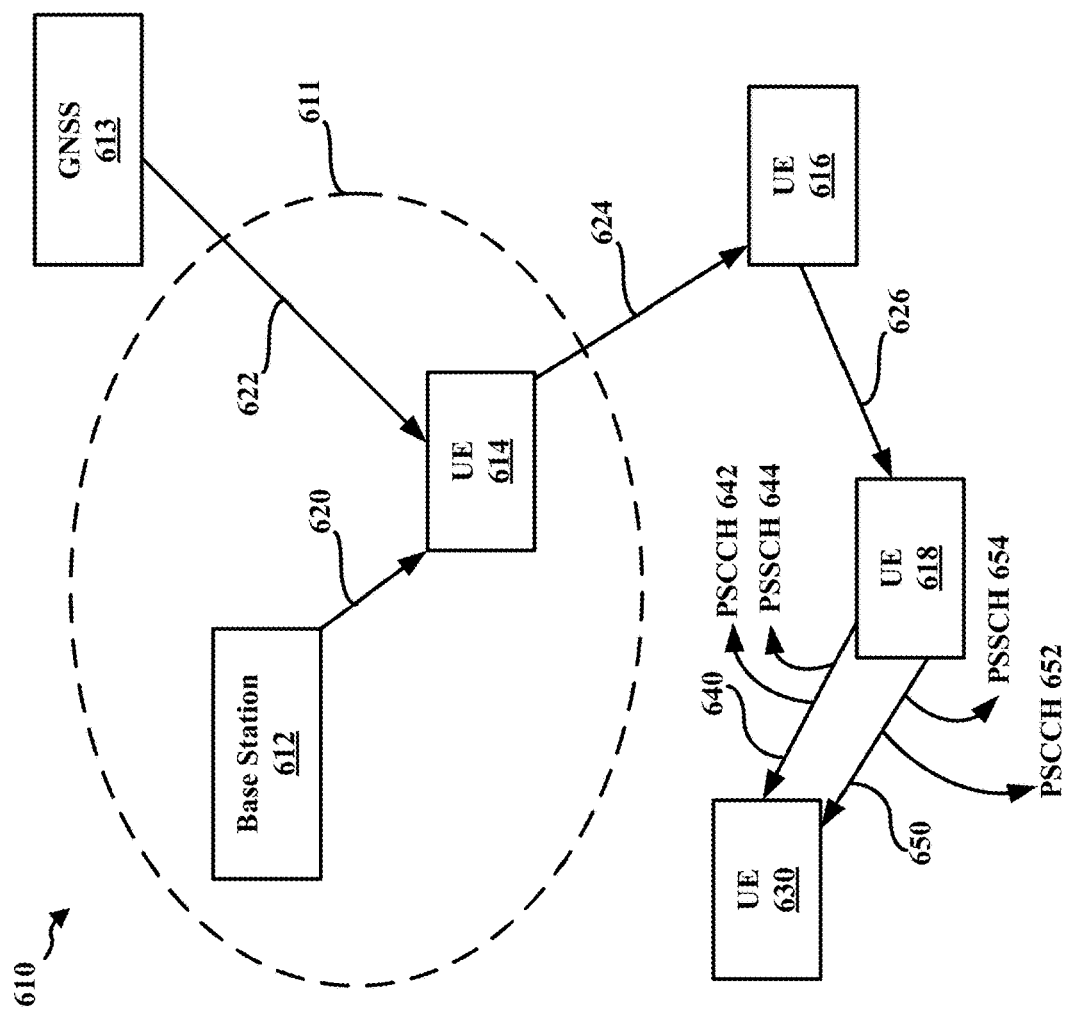
FIG. 6B illustrates an example of device synchronization, in accordance with aspects presented herein.
Figure 6A:
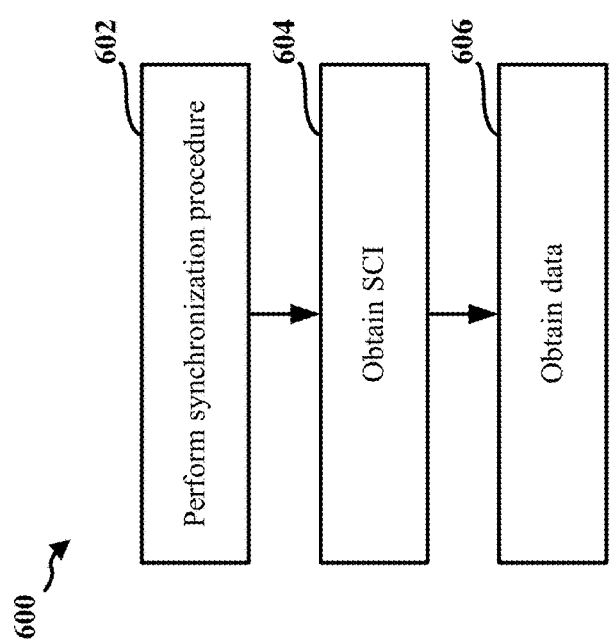
FIG. 6A is a flowchart of a method of wireless communication for obtaining data from a sidelink communication, in accordance with aspects presented herein.

FIG. 6A is a flowchart 600 of a method of wireless communication. The method may be performed by a UE (e.g., a receiving sidelink UE, such as the UE 104, the second wireless communication device 350, and/or an apparatus 1302 of FIG. 13). The method may facilitate searching for PSCCH.

At 602, the UE performs a synchronization procedure to synchronize with a common timing reference. The UE may perform the synchronization procedure based on a GNSS signal, a base station SSB, and/or an SLSS from a SyncRef UE.

At 604, the UE may obtain SCI for a sidelink communication. For example, after performing the synchronization procedure, the UE may obtain a master information block (MIB) that may indicate a PSCCH configuration for receiving PSCCH. The PSCCH configuration may indicate a resource pool associated with PSCCH candidates. Based on the PSCCH configuration, the UE may start searching for PSCCH. After finding a PSCCH, the UE may obtain the SCI from the PSCCH. The SCI may include a frequency resource assignment and a time resource assignment for PSSCH.

At 606, the UE may obtain the data for the sidelink communication. For example, after obtaining the SCI, the UE may extract data from the PSSCH. The UE may use the frequency resource assignment and the time resource assignment from the SCI to detect and decode the PSSCH and to extract the data (e.g., a transport block) from the PSSCH.

FIG. 6B illustrates an example 610 of device synchronization, as presented herein. In the illustrated example of FIG. 6B, a first UE 614 may synchronize directly via a base station 612 or a GNSS 613. For example, the base station 612 may transmit an SSB 620 that is received by the first UE 614. The SSB 620 may include a primary synchronization signal (PSS), a secondary synchronization signal (SSS), and a physical broadcast channel (PBCH). Additionally, or alternatively, the GNSS 613 may transmit a GNSS signal 622 that is received by the first UE 614. The first UE 614 may synchronize based on the SSB 620 and/or the GNSS signal 622. In some examples, the first UE 614 may be configured to prioritize the SSB 620 when available. In other examples, the first UE 614 may be configured to prioritize the GNSS signal 622 when available. In the example of FIG. 6B, the first UE 614 is directly synchronized with a base station/GNSS based on whether the first UE 614 uses the SSB 620 or the GNSS signal 622 to perform the synchronization.

The first UE 614 may be configured to transmit a synchronization signal, which may be used by other UEs to perform a synchronization procedure. For example, the first UE 614 may transmit an SLSS 624 that is received by a second UE 616. In the example of FIG. 6B, the second UE 616 is out-of-coverage of the base station 612 (e.g., is located outside an area 611 of the base station 612) and, thus, is unable to receive the SSB 620. The second UE 616 may also be unable to receive the GNSS signal 622, for example, due to being underground. In such examples, the second UE 616 may use the SLSS 624 to perform its synchronization. When a UE synchronizes to another UE that synchronizes to a base station/GNSS, the UE may be referred to as UE synchronizing to a UE directly synchronizing to the base station/GNSS. For example, the second UE 616 may be referred to as a UE synchronizing to the first UE 614 directly synchronizing to the base station 612 or the GNSS 613. It may be appreciated that for the second UE 616 to synchronize to the first UE 614, the first UE 614 may be configured for SLSS transmission and the second UE 616 may be configured for SLSS reception.

As shown in FIG. 6B, a third UE 618 may synchronize to the second UE 616 based on a signal received from the second UE 616. For example, the second UE 616 may transmit an SLSS 626 that is received by the third UE 618. The third UE 618 may use the SLSS 626 to perform its synchronization. In the example of FIG. 6B, the third UE 618 may be referred to as a UE synchronizing to a UE indirectly synchronizing to the base station/GNSS Similar to the synchronization procedure of the second UE 616, it may be appreciated that for the third UE 618 to synchronize to the second UE 616, the second UE 616 may be configured for SLSS transmission and the third UE 618 may be configured for SLSS reception.

In the example of FIG. 6B, the first UE 614 may be referred to as a SyncRef UE for the second UE 616, and the second UE 616 may be referred to as a SyncRef UE for the third UE 618.

However, in some examples, a UE may be unable to synchronize based on a GNSS, a base station, and a SyncRef UE. For example, in the example of FIG. 6B, a fourth UE 630 is located out-of-coverage of the base station 612 and is unable to receive the SSB 620. The fourth UE 630 may also be unable to receive the GNSS signal 622 from the GNSS 613, for example, due to being located underground. Additionally, the fourth UE 630 may not be configured to receive SLSS and/or the third UE 618 may not be configured to transmit SLSS. In such examples, the fourth UE 630 may be unable to perform a synchronization based on a GNSS, a base station, and a SyncRef UE. Thus, the fourth UE 630 may be operating in an out of synchronization state.

In some examples, a UE may perform an initial synchronization via a synchronization source (e.g., a GNSS, a base station, or a SyncRef UE) and then the synchronization source may become unavailable to the UE. For example, the fourth UE 630 may initially be located within the area 611 of the base station 612, receive the SSB 620, and synchronize based on the SSB 620. After synchronizing to the base station 612, the fourth UE 630 may move outside the area 611 and, thus, the SSB 620 may be unavailable to the fourth UE 630. While the fourth UE 630 may be able to maintain synchronization for a period, the frequency resources and/or time resources for sidelink communications may drift over time and the fourth UE 630 may become out of synchronization (e.g., be operating in an out of synchronization state).

However, a UE may be transmitting sidelink communications to the fourth UE 630. For example, the third UE 618 may be transmitting a first sidelink communication 640 including a first PSCCH 642 and a first PSSCH 644. The third UE 618 may also be transmitting a second sidelink communication 650 including a second PSCCH 652 and a second PSSCH 654. The fourth UE 630 may be unable to receive the first sidelink communication 640 and/or the second sidelink communication 650 while being in an out of synchronization state.

Aspects disclosed herein provide techniques for performing an initial synchronization directly to PSCCH/PSSCH (e.g., to perform an autonomous synchronization). Performing such an autonomous synchronization may be beneficial when, for example, a synchronization source, such as a GNSS signal, a base station SSB, and/or an SLSS, is unavailable. As disclosed herein, the PSCCH/PSSCH may allow the UE to establish a synced status and also to maintain the synced status. Thus, disclosed techniques enable the UE to continue transmitting/receiving sidelink communications (e.g., PSCCH messages and/or PSSCH messages) and, thereby, enable the UE to continue serving as an additional safety sensor in different conditions (e.g., when a synchronization source (e.g., a GNSS signal, a base station SSB, or an SLSS) is unavailable for the initial synchronization, such as a "cold bootup," or when trying to maintain the synced status when the synchronization source later becomes unavailable. It may be appreciated that SLSS may be unavailable when SLSS reception/transmission is not configured at the UE and/or at nearby UEs, or may be available when SLSS is configured but the UE is unable to successfully receive the SLSS.

Aspects disclosed herein facilitate performing the initial synchronization directly to the PSCCH/PSSCH based on performing a timing and frequency synchronization (e.g., a first phase) and performing a logical subframe number synchronization (e.g., a second phase). Disclosed techniques may use received PSCCH to perform the timing and frequency synchronization. Additionally, disclosed techniques may use received PSSCH to perform the logical subframe number synchronization.

Figure 7:
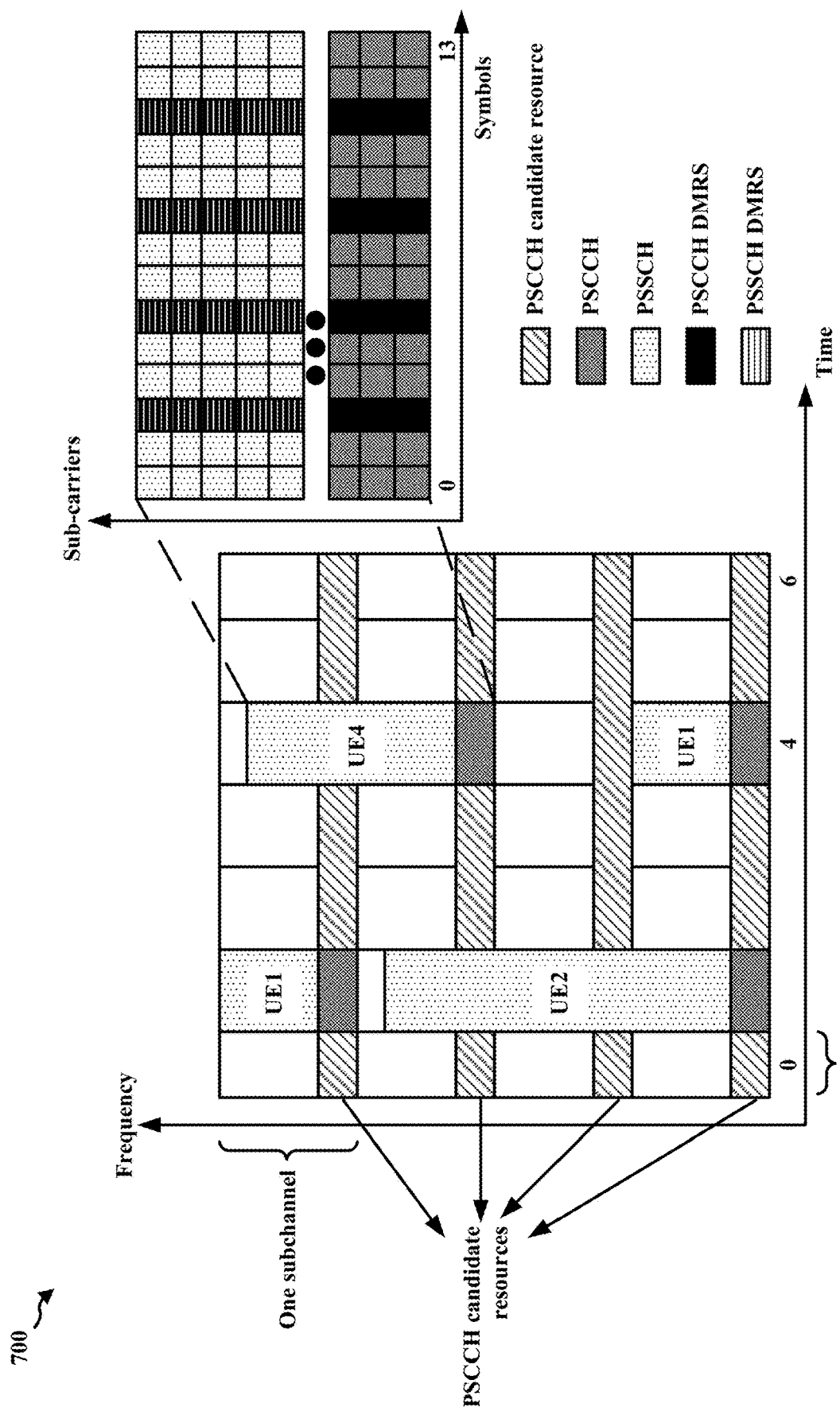
FIG. 7 illustrates an example of resource allocations in a subframe for sidelink communications, in accordance with aspects presented herein.

FIG. 7 illustrates an example 700 of resource allocations in a subframe for sidelink communications, as presented herein. The example 700 may include optional resource allocations for sidelink communications. In the illustrated example of FIG. 7, and as described herein, some of the optional resource allocations are actual resources allocated by particular UEs. The example 700 includes a set of subframes and frequency resource blocks within. The physical resources (e.g., subframes and resources blocks) associated with the example 700 are partitioned into a sequence of repeating hyperframes, which may be referred to as PSSCH periods, scheduling assignment (SA) periods, or sidelink control periods. A hyperframe may have a duration of 10240 milliseconds (ms), each hyperframe may include 1024 frames, and each frame may include 10 subframes. Thus, a subframe may have a duration of 1 ms and a hyperframe may include 10240 subframes. Within the hyperframe, there may be separate resource pools for control and data.

In the illustrated example of FIG. 7, PSCCH and its associated PSSCH are transmitted in a same subframe. For example, a first UE and a second UE may transmit sidelink communications in subframe #1 of the example 700. The first UE and a fourth UE may transmit sidelink communications in subframe #4 of the example 700. However, the transmission of the PSCCH and the PSSCH may be adjacent or non-adjacent. FIG. 7 illustrates an example of adjacent allocations of PSCCH and associated PSSCH. For example, the lowest pair of resource blocks (RBs) in each subchannel may be candidates to contain PSCCH, and the associated PSSCH may transmitted in the continuous RBs above them for the allocated number of subchannels. In non-adjacent transmissions of PSCCH and PSSCH, a first pool may be dedicated to transmitting PSCCH and the PSCCH may occupy two RBs. A second pool may be reserved for transmitting associated PSSCH and may be divided in subchannels.

In the example of FIG. 7, subcarriers have a total of 14 symbols per subframe. Additionally, four of the symbols may be dedicated to the transmission of demodulation reference signals (DMRS). DMRS may be used for channel estimation. DMRS associated with PSCCH and PSSCH are transmitted in the $3^{rd}$, $6^{th}$, $9^{th}$, and $12^{th}$ symbols of a subframe. The remaining ten symbols of the subframe are used to carry information (e.g., the SCI in the PSCCH or the transport block in the PSSCH).

In some examples, a sidelink configuration may indicate which subframes may be used for sidelink using repeating bitmaps, which may be referred to as "subframeBitmap" or by any other name. Each bitmap may be of a certain size and indicated via the sidelink configuration. For example, a bitmap may be of length 16 bits, 20 bits, or 100 bits.

FIG. 8A illustrates resources of a portion of hyperframe 800, as presented herein. In the example of FIG. 8A, the resources are associated with a physical subframe number 802. The physical subframe number goes from 0 to 10239. In the illustrated example, the portion of the hyperframe 800 includes physical subframes n−7 to n+8. In the example of FIG. 8A, the resources that are allocated to a sidelink resource pool are indicated by a shaded region. As shown in FIG. 8A, the resources may be allocated in a discontinuous manner in the time domain.

A subframe bitmap 804 may be used to determine the resources allocated to the sidelink resource pool. The subframe bitmap 804 of the illustrated example of FIG. 8A is of length 16 bits and indicates which logical subframes are included in the sidelink resource pool. For example, a "0" value in the subframe bitmap 804 may indicate that the corresponding logical subframe is not included in the sidelink resource pool, and a "1" value in the subframe bitmap 804 may indicate that the corresponding logical subframe is included in the sidelink resource pool. As described herein, the physical subframe may be determined based on the logical subframe and additional information, such as the SLSS and/or information regarding reserved subframes.

In the example of FIG. 8A, a logical mapping may map the physical subframes included in the sidelink resource pool to respective logical subframes (e.g., to logical subframe numbers 806). In the illustrated example, the subframes belonging to the sidelink resource pool are indexed from k−5 to k+6.

To generate the hyperframe from the subframe bitmap, the UE may perform a multiplication of the subframe bitmap into the full bitmap (e.g., the hyperframe bitmap). For example, when the subframe bitmap is of length 16 bits or 20 bits, the subframe bitmap may be repeated 640 times or 512 times, respectively, to generate the hyperframe bitmap. However, the multiplier may not always be an even multiplier. For example, when the subframe bitmap is of length 100 bits, there is a remainder of 40 subframes. In such examples in which the length of the subframe bitmap results in a remainder, then certain subframes may be allocated as reserved subframes. Additionally, the periodicity of the reserved subframes may be determined as once every 256 subframes (e.g., 10240 subframes/40 reserved subframes=256 subframes).

FIG. 8B illustrates a sequence 820 of subframes, as presented herein. Each of the subframes of the sequence 820 may be associated with physical subframe numbers 822. As shown in FIG. 8B, certain of the subframes of the sequence 820 may be allocated as reserved subframes. For example, physical subframes 0, 256, and 512 are allocated as reserved ("R") subframes in the example of FIG. 8B. When mapping the physical subframes to logical subframes, the UE may skip counting the reserved subframes. Thus, as shown in FIG. 8B, certain subframes of the sequence 820 are associated with a logical subframe number 824. For example, the physical subframe 0 is allocated as a reserved frame and, therefore, is not counted as a logical subframe. Thus, the first logical subframe (e.g., logical subframe #0) corresponds to physical subframe #1. Similarly, while physical subframe #255 corresponds to logical subframe #254, as physical subframe #256 is a reserved subframe, logical subframe #255 corresponds to physical subframe #257. Additionally, while logical subframe #509 maps to physical subframe #511, logical subframe #510 maps to physical subframe #513 as physical subframe #512 is a reserved subframe.

In the example of FIG. 8B, the subframe bitmap is of length 100 bits, resulting in 40 reserved subframes that occur every 256 subframes with respect to the physical subframe numbers 822. However, the example of FIG. 8B does not include any subframes that are allocated for SLSS. That is, the UE may not be configured for receiving SLSS and, thus, does not have an SLSS configuration indicating whether subframes are allocated for SLSS.

FIG. 8C illustrates a sequence 840 of subframes, as presented herein. Each of the subframes of the sequence 840 may be associated with physical subframe numbers 842. Similar to the example of FIG. 8B, the subframe bitmap is of length 100 bits, resulting in 40 reserved subframes that occur every 256 subframes with respect to the physical subframe numbers 842. Additionally, certain of the subframes may be allocated to SLSS based on an SLSS configuration. The SLSS configuration may indicate that a period of 160 ms (e.g., 160 subframes) may include 0, 1, 2, or 3 SLSS subframes. In the example of FIG. 8C, the SLSS configuration indicates that two SLSS are configured with offset values of 0 and 2. For example, the physical subframe #0, #160, etc. may be allocated to SLSS. Additionally, the physical subframe #2, #162, etc. may be allocated to SLSS.

Similar to reserved subframes, subframes allocated to SLSS may be skipped when counting the logical subframes. Thus, as shown in FIG. 8C, certain subframes of the sequence 840 are associated with a logical subframe number 844, while other subframes are not associated with a logical subframe number. For example, the physical subframe #3 maps to logical subframe #0 as physical subframe #0 and #2 are allocated to SLSS subframes and physical subframe #1 is allocated to a reserved subframe. Similarly, the physical subframe #160 and #162 are not mapped to a logical subframe as they are allocated as SLSS subframes, but the physical subframe #161 maps to logical subframe #157. Additionally, while logical subframe #840 maps to physical subframe #853, logical subframe #841 maps to physical subframe #855 as physical subframe #854 is a reserved subframe.

Aspects disclosed herein may perform synchronization in two phases. A first phase may be based on PSCCH transmission/reception. A second phase may be based on PSSCH transmission/reception.

FIG. 9 illustrates an example communication flow 900 between a first UE 902 (e.g., a sidelink receiving UE) and a second UE 904 (e.g., a sidelink transmitting UE), as presented herein. In the illustrated example, the communication flow 900 facilitates the first UE 902 performing autonomous synchronization based on PSCCH and PSSCH. Aspects of the first UE 902 and/or the second UE 904 may be implemented by the UE 104 of FIG. 1 and/or the second wireless communication device 350 of FIG. 3. Although not shown in the illustrated example of FIG. 9, in additional or alternate examples, the first UE 902 and/or the second UE 904 may be in communication with one or more other base stations or UEs.

In the illustrated example of FIG. 9, the first UE 902 starts in a power off state and, thus, is attempting to perform an initial synchronization. However, in other examples, the first UE 902 may perform an initial synchronization based on a synchronization signal (e.g., a GNSS signal, a base station SSB, and/or a SyncRef UE SLSS) that subsequently becomes unavailable to the first UE 902.

At 910, the first UE 902 powers on from a power off state. For example, the first UE 902 may be without any synchronization information at the time of wake-up.

At 912, the first UE 902 attempts to obtain a synchronization signal. For example, the first UE 902 may attempt to receive a GNSS signal, such as the GNSS signal 622 of FIG. 6B, and/or may attempt to receive a base station SSB, such as the example SSB 620 of FIG. 6B. If the first UE 902 is configured for SLSS reception, the first UE 902 may also, or alternatively, attempt to receive a SyncRef UE SLSS, such as the example SLSS 624 and/or the SLSS 626 of FIG. 6B.

As shown in FIG. 9, the second UE 904 may transmit a sidelink communication that is received by the first UE 902. For example, the second UE 904 may transmit a PSCCH 914 and a PSSCH 916. Aspects of the PSCCH 914 may be implemented by the first PSCCH 642 and aspects of the PSSCH 916 may be implemented by the first PSSCH 644 of FIG. 6B. Although the example of FIG. 9 illustrates the second UE 904 transmitting the PSCCH 914 and the PSSCH 916 after the first UE 902 attempts to obtain a synchronization signal, in other examples, the second UE 904 may transmit the PSCCH 914 and the PSSCH 916 at any time during the example of FIG. 9. Additionally, the second UE 904 may transmit multiple sidelink communications that the first UE 902 may attempt to receive.

In the example of FIG. 9, the first UE 902 is unable to obtain a synchronization signal. For example, the first UE 902 may be unable to receive a GNSS signal, a base station SSB, and a SyncRef UE SLSS.

At 918, the first UE 902 may attempt to search for PSCCH (e.g., the PSCCH 914). In some examples, detecting PSCCH may include successfully decoding PSCCH. To decode PSCCH, the first UE 902 may obtain a timing synchronization (e.g., at 920) and obtain a frequency synchronization (e.g., at 922). However, since PSCCH and PSSCH may be multiplexed in time and frequency domains, the first UE 902 may need to sample signals over one or more of the subchannels (e.g., over all of the subchannels) at one or more subframes for detection of the PSCCH. For example, the first UE 902 may store the sampled signals (e.g., the PSCCH and associated PSSCH) in memory and attempt to detect a PSCCH based on the stored sampled signals. When a PSCCH is detected, the first UE 902 may attempt to decode the associated PSSCH, which may also be stored in the memory.

Obtaining the timing synchronization, at 920, may be based on a symbol boundary and a subframe boundary. As described in connection with FIG. 7, DMRS is transmitted with PSCCH in a subframe. Additionally, the location of the DMRS in the subframe is known. For example, DMRS associated with PSCCH is transmitted at the $3^{rd}$ symbol, the $6^{th}$ symbol, the $9^{th}$ symbol, and the $12^{th}$ symbol of a subframe. Thus, after a subframe boundary is determined, the symbol boundaries are also known. Thus, when the description describes that a subframe boundary is determined or the symbol boundaries are determined, it may be assumed that both the subframe boundary and the symbol boundaries are known.

As disclosed herein, the first UE 902 may apply time correlation to the known PSCCH DMRS sequences and locations to estimate the symbol boundaries and the subframe boundaries. For example, the first UE 902 may compute a correlation between a received signal and a reference signal (e.g., the PSCCH DMRS). If the received signal has a PSCCH present in a subframe, then the first UE 902 detects a correlation between the received signal and the reference signal. When the first UE 902 detects correlation, the first UE 902 may determine that the received signal includes the reference signal. However, in the example of the PSCCH DMRS that may be located at four different symbols, there may still be ambiguity with respect to the subframe boundary.

As used herein, the first UE 902 may detect a correlation between a received signal and a reference signal when the similarity between the received signal and the reference signal satisfy a similarity threshold. The similarity may be determined as an output of a cross-correlation function. The similarity threshold may be set to a value that weighs the tradeoff between missed detections (e.g., when the similarity threshold is set too high) and false detections (e.g., mistakenly detected correlations).

As an example, the first UE 902 may perform time correlation based on known reference signals, such as PSCCH DMRS. If a received signal includes PSCCH, then the first UE 902 also knows that the received signal includes PSCCH DMRS and, in particular, that PSCCH DMRS are located at the $3^{rd}$ symbol, the $6^{th}$ symbol, the $9^{th}$ symbol, and the $12^{th}$ symbol of the subframe. Additionally, the DMRS sequence at each of the symbols is the same. The first UE 902 may use a PSCCH DMRS sequence to search for DMRS within the received signal over time. When the first UE 902 detects a correlation between the received signal and the PSCCH DMRS sequence, the first UE 902 may declare that the received signal includes PSCCH DMRS and, thus corresponds to a PSCCH. However, as the PSSCH DMRS is expected at four different symbol locations, the subframe boundary and the symbol boundaries of the received signal are still ambiguous.

In some examples, the first UE 902 may obtain the timing synchronization by computing a correlation for each subchannel (n) of a received signal and the PSCCH DMRS sequence at all PSCCH DMRS locations (i). The first UE 902 may then identify the pairs (n, i) associated with the strongest correlations and determine that the received signal includes the PSCCH DMRS, accordingly.

In some examples, to resolve the ambiguity between the detected PSCCH DMRS and the subframe boundary, the first UE 902 may apply four different hypotheses of subframe boundaries and attempt to detect the DMRS at each of the respective symbol locations. For example, and referring to the example of FIG. 7, the first UE 902 may try a first hypothesis in which symbol 0 is the subframe boundary, may try a second hypothesis in which symbol 1 is the subframe boundary, may try a third hypothesis in which symbol 2 is the subframe boundary, and may try a fourth hypothesis in which symbol 3 is the subframe boundary. Based on which of the tested hypotheses results in a detected DMRS, the first UE 902 may determine the subframe boundary and the symbol boundaries.

In some examples, to resolve the ambiguity between the detected PSCCH DMRS and the subframe boundary, the first UE 902 may further perform time correlation with each configured subchannel sequence. For example, the PSCCH DMRS sequence of the different subchannels may be the same, but they may appear different in the time domain as each PSCCH DMRS sequence may have a different frequency location. Thus, the first UE 902 may adjust the time domain representation of the PSCCH DMRS sequence via a different phase ramp to represent the actual frequency location of each subchannel.

For example, a sidelink resource pool may have a subchannel size five and a total bandwidth of 20 MHz. In such an example, there may be a total of 20 subchannels that are PSCCH DMRS candidates. However, as the signal may occupy one subchannel, each of the 20 subchannels may be tested to determine which subchannel occupies the signal. Thus, the first UE 902 may apply the different subchannel hypotheses to determine the timing synchronization. It may be appreciated that the quantity of hypotheses that the first UE 902 tests is based on the quantity of configured subchannels (e.g., 20 subchannels in this example).

After obtaining, at 920, the timing synchronization (e.g., the symbol boundary and the subframe boundary), the first UE 902 obtains, at 922, a frequency synchronization. To obtain the frequency synchronization, the first UE 902 may perform one or more frequency offset hypotheses associated with respective subchannels. Although the distance between subchannels may be constant, there may be some variation, for example, due to channel conditions, that may result in a frequency offset. Thus, the first UE 902 may perform frequency offset tests to obtain a frequency offset associated with a subchannel. The obtained frequency offsets for the subchannels may facilitate obtaining the frequency synchronization. In some examples, the first UE 902 may also perform some refinement to the synchronizations to detect the locations of the different PSCCH DMRS symbols of the received signal.

Although the above example describes detecting an initial PSCCH based on detected correlations, other examples may employ additional or alternate techniques to detect the initial PSCCH. For example, the first UE 902 may perform energy measurements on symbols in a subframe and compare differences in the measurements to determine if the subframe includes PSCCH. In such examples, the first UE 902 may also perform refinement procedures to determine a frequency offset.

After detecting the PSCCH (e.g., based on obtaining the timing synchronization and the frequency synchronization), the first UE 902 may decode the PSCCH (e.g., at 924). For example, the first UE 902 may apply decoding and demodulation procedures to the PSCCH to obtain the SCI carried by the PSCCH. The SCI may include a frequency resource assignment and a time resource assignment for PSSCH. For example, the SCI may indicate a physical subframe number.

In some examples, after the timing synchronization (e.g., the symbol boundary and the subframe boundary) is obtained and the frequency synchronization (e.g., the subchannel and frequency offset) is obtained, the first UE 902 may track the synchronizations over time based on additional PSCCH receptions. For example, and referring to the example of FIG. 6B, the first UE 902 may use the first sidelink communication 640 to obtain the initial timing synchronization and the initial frequency synchronization, and then track the synchronizations over time based on reception of the second PSCCH 652 of the second sidelink communication 650.

At 926, the first UE 902 attempts to decode PSSCH (e.g., the PSSCH 916). In some examples, decoding the PSSCH may include determining that there is a signal that can be demodulated and decoded to obtain the data being transmitted and determining that the cyclic redundancy check (CRC) for the PSSCH is successful (e.g., passes). In some examples, to decode the PSSCH, the first UE 902 applies scrambling sequences and DMRS sequences. The scrambling sequences may be used to descramble the PSSCH. The DMRS sequences may be used to perform frequency estimations, channel estimations, etc. However, the scrambling sequences and the DMRS sequences may be initiated based on a sequence seed (k modulo 10, sometimes written as "k mod 10"). The value "k" may be the logical subframe number within a hyperframe. Thus, the sequence seed for performing the scrambling sequences and the DMRS sequences is based on the logical subframe number. For example, when trying to demodulate a PSSCH packet, the first UE 902 applies the sequence seed (e.g., k modulo 10) to generate the scrambling sequence.

For a correctly decoded PSCCH (e.g., at 924), the first UE 902 may decode the associated PSSCH by trying different hypotheses. In the example of FIG. 9, the first UE 902 may try ten different hypotheses (e.g., ten different values of a sequence seed from "0" to "9"). For example, while the PSCCH may indicate that the associated PSSCH is located in a particular physical subframe, the logical subframe number may not be a one-to-one mapping from the physical subframe number and, thus, the sequence seed used to perform the demodulation may be unknown. However, as the sequence seed is based on the modulo 10 of the logical subframe number, and not the exact logical subframe number, the first UE 902 may determine that the value of the sequence seed is one of ten values (e.g., 0 to 9). For example, if the PSCCH indicates that the associated PSSCH is located at the physical subframe #254, in examples in which there is a one-to-one mapping between the physical subframe and the logical subframe, the physical subframe number may be determined as "254," and the sequence seed may be determined to be "4" (e.g., 254 modulo 10=4). However, in view of reserved subframes and skipped subframes, the mapping may not be one-to-one and, thus, a logical subframe number and the physical subframe number may be different for the same subframe. Thus, the first UE 902 may try different hypotheses from 0 to 9 for the sequence seed to attempt to successfully demodulate the PSSCH. When the CRC for the PSSCH is successful, the first UE 902 may determine that the successful hypothesis (e.g., the sequence seed) is correct and determine the logical subframe number modulo 10 (e.g., at 928). For example, the first UE 902 may determine that the sequence seed of "6" is the successful hypothesis. The first UE 902 may then determine that the physical subframe "254" corresponds to the logical subframe "256" as 256 modulo 10 is six.

Once a PSSCH is successfully decoded at a subframe, the value of the sequence seed increases by one for each logical subframe. For example, and referring to the example of FIG. 8A, if the value of the sequence seed for demodulating the logical subframe #k is found to be four, then the value of the sequence seed for demodulating the logical subframe #k+1 is expected to be five, the value of the sequence seed for demodulating the logical subframe #k+2 is expected to be six, etc.

The above approach of increasing the value of the sequence seed for each logical subframe applies when the hyperframe does not include special subframes (e.g., reserved subframes and/or SLSS subframes). For example, when SLSS is not configured for the first UE 902 and the subframe bitmap is of length 16 bits or 20 bits, then once a value of a sequence seed is successful, then the sequence seed value may continue to increase by one and cycle from 0 to 9 for each respective subsequent logical subframe. That is, the value of the sequence seed is deterministically known from the current logical subframe onward and applying additional PSSCH hypotheses are not needed.

However, when SLSS is configured for the first UE 902 and/or the subframe bitmap is of length 100 bits, then the SLSS subframes and/or reserved subframes may introduce a skip in the logical subframe counting. In such scenarios, after an initial sequence seed value is found, the value of the sequence seed is not deterministically known from the current logical subframe onward as certain physical subframes are skipped when mapping to and counting the logical subframes, as shown in the examples of FIG. 8B and FIG. 8C. In such scenarios, when decoding of a subsequent PSSCH is unsuccessful based on the expected sequence seed, the first UE 902 may perform additional hypotheses testing, which may allow the first UE 902 to resynchronize the logical subframe count.

For example, in the example sequence 820 of FIG. 8B, the subframe bitmap is of length 100 bits, resulting in 40 reserved subframes being allocated in the hyperframe. Additionally, the periodicity of the reserved subframes is known to be every 256 subframes (e.g., 10240 subframes/40 reserved subframes=256 subframes). That is, there is a reserved subframe every 256 subframes of the hyperframe. The SCI of a first PSCCH may indicate that there is an associated PSSCH located at physical subframe #255. The first UE 902 may compare the signal at the physical subframe #255 to a set of hypotheses to determine a sequence seed for demodulating and decoding the PSSCH. When the CRC passes for the PSSCH, the first UE 902 may determine the value of the sequence seed and increment the value of the sequence seed to facilitate decoding subsequent PSSCH. For example, at physical subframe #254, the first UE 902 may determine the value of the sequence seed to be four. The first UE 902 may then increment the sequence seed from the successful hypothesis (e.g., four) for each subframe. Accordingly, the first UE 902 may expect the value of the sequence seed at the next subframe (e.g., the physical subframe #256) to be five as the increase is one subframe, and the value of the sequence seed for the next subframe (e.g., the physical subframe #257) is expected to be six, etc.

However, as shown in FIG. 8B, the physical subframe #256 is a reserved subframe and, thus, the first UE 902 will be unable to detect a signal at the respective subframe and move to the next subframe (e.g., the physical subframe #257). If the first UE 902 detects a signal at the next subframe (e.g., the physical subframe #257), the first UE 902 may apply the expected value of the sequence seed based on the increase in subframes from the last successful hypothesis (e.g., the value "4" at the physical subframe #254). For example, the first UE 902 may attempt to use the sequence seed value of "6" for the physical subframe #257. However, since there was a reserved subframe, the first UE 902 is out of synchronization with respect to the expected sequence seed and the actual sequence seed. That is, applying the value six at the physical subframe #257 when attempting to demodulate the PSSCH at the physical subframe #257 will be unsuccessful. However, by reapplying the hypotheses for the physical subframe #257, the first UE 902 may determine the correct value of the sequence seed (e.g., five) for the physical subframe #257 (e.g., determine the logical subframe number modulo 10 at 928). Thus, by successfully demodulating the PSSCH at the physical subframe, the first UE 902 may detect the logical subframe number modulo 10 for the respective physical subframe (e.g., the sequence seed value of "5" for the physical subframe #257). The first UE 902 may also determine that the physical subframe #257 corresponds to the logical subframe #255.

As the periodicity of the reserved subframes is known to the first UE 902, the first UE 902 may build a bitmap of the hyperframe (e.g., at 930) based on the location of the reserved subframe (e.g., at physical subframe #256), the known periodicity of the reserved subframes (e.g., every 256 subframes), and the subframe bitmap. For example, the first UE 902 may determine that physical subframe #512 is a reserved subframe and, thus, when determining the value of the sequence seed to apply at logical subframe #510, the first UE 902 may increase the sequence seed by one from the logical subframe #509 instead of by two as the first UE 902 incorrectly did when attempting to demodulate the PSSCH at the logical subframe #255.

In scenarios in which the first UE 902 is expecting PSSCH in each subframe, when a PSSCH decoding miss occurs after an initial PSSCH decoding success, then the first UE 902 may determine that at least one subframe prior to the current subframe includes a reserved subframe. However, in other examples, valid transmissions of PSSCH may be less frequent. For example, a valid PSSCH transmission may occur every 100 ms (e.g., every 100 subframes). In a physical subframe #n that the first UE 902 successful decodes, the first UE 902 may determine the correct sequence seed value. But over a period of 100 subframes (e.g., at a physical subframe #n+100), there may be a reserved subframe. For example, in the example of FIG. 8B, a physical subframe #n may correspond to a logical subframe #50 and a physical subframe #n+100 may correspond to a logical subframe #150. In such a scenario, there may be no reserved subframes after a first period (e.g., between the physical subframe #n and the physical subframe #n+100) and after a second period (e.g., between the physical subframe #n+100 and a physical subframe #n+200). However, after a third period, a reserved subframe occurs in-between the two physical subframes (e.g., at physical subframe #n+256 between the physical subframe #n+200 and a physical subframe #n+300). Additionally, if valid transmissions of PSSCH are even less frequent (e.g., occur less than every 100 ms), it may possible that multiple reserved subframes may occur between the valid PSSCH transmissions. However, by reapplying the hypotheses once an unsuccessful PSSCH is detected, the first UE 902 may resynchronize to the logical subframe number and, more particularly, the sequence seed value (e.g., k modulo 10) for the respective logical subframe number.

Thus, it may be appreciated that over time, the first UE 902 may maintain synchronization with the logical subframe number modulo 10 (e.g., at 928). Additionally, the first UE 902 may build a hyperframe bitmap (e.g., at 930).

In some examples, the first UE 902 may be configured to receive SLSS and, thus, certain subframes may be allocated to SLSS. However, the first UE 902 may be unable to receive the SLSS and, thus, may perform the example techniques of autonomous synchronization disclosed herein. For example, and referring to the example of FIG. 8C, when the subframe bitmap is of length 100 bits and the first UE 902 is configured to receive SLSS, then the hyperframe may include SLSS subframes and reserved subframes that are skipped when maintaining the correct sequence seed value across physical subframes. In such scenarios, building the hyperframe bitmap (e.g., at 930) may still be performed, but may take longer (e.g., more periods) as the first UE 902 determines where the reserved subframes are located and also where the SLSS subframes are located based on unsuccessfully decoded PSSCH.

Additionally, it may be appreciated that the detection of reserved subframes (and/or SLSS subframes when configured) may be easier to determine in environments in which transmissions of sidelink communications are frequent (e.g., a valid PSSCH transmission every subframe) compared to environments in which transmissions of sidelink communications are less frequent (e.g., a valid PSSCH transmission every 100 subframes or every 200 subframes, etc.). That is, more frequent sidelink communications provides the first UE 902 more opportunities to synchronize and to resynchronize to the logical subframe number and the sequence seed value (e.g., k modulo 10) for the respective logical subframe number, and to detect a reserved subframe and/or an SLSS subframe.

Figure 10:
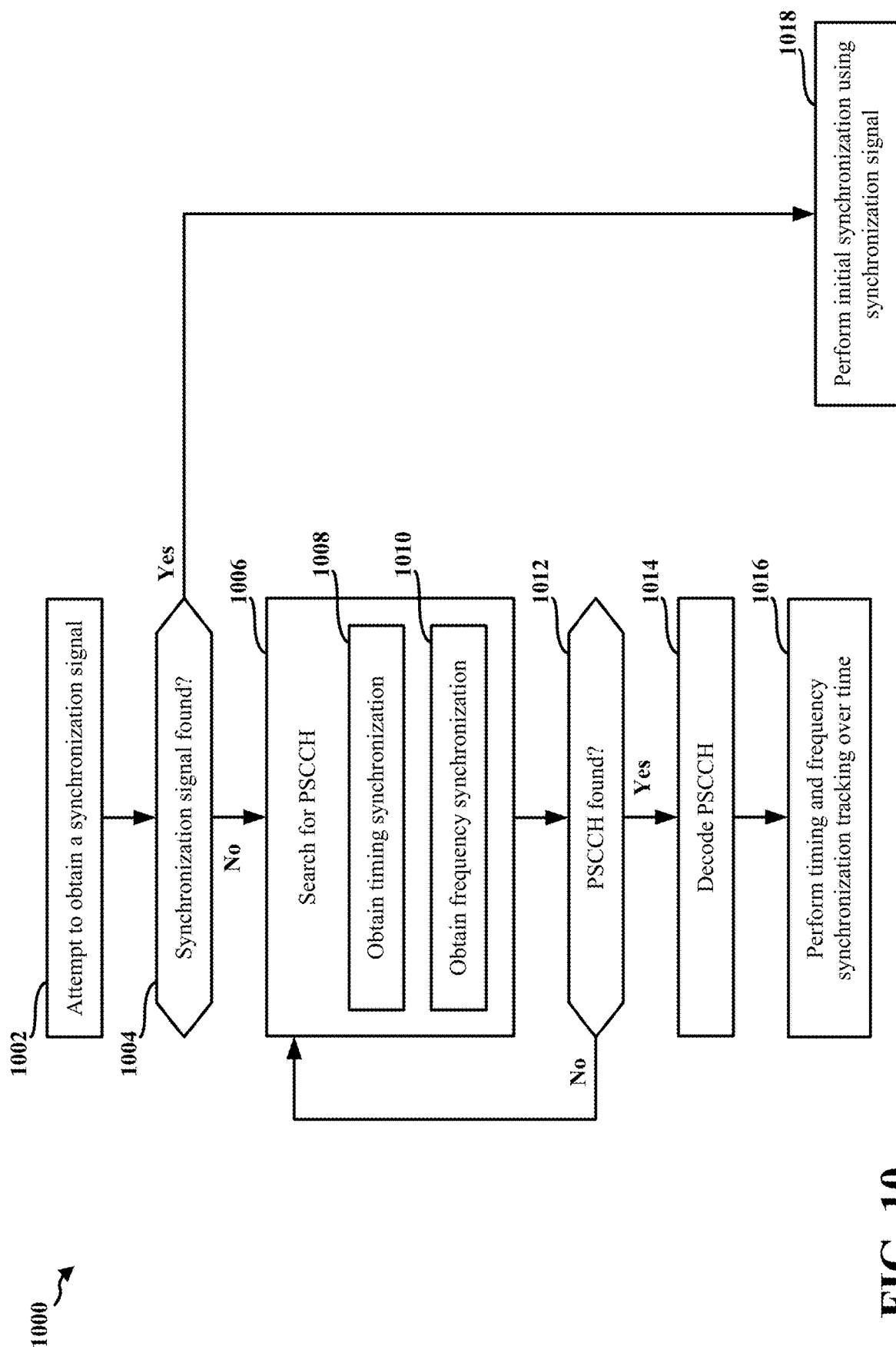
FIG. 10 is a flowchart of a method of wireless communication at a UE, in accordance with the teachings disclosed herein.

FIG. 10 is a flowchart 1000 of a method of wireless communication. The method may be performed by a UE (e.g., a receiving sidelink UE, such as the UE 104, the second wireless communication device 350, and/or an apparatus 1302 of FIG. 13). The method may facilitate searching for PSCCH while performing autonomous synchronization, which may improve communication performance by maintaining synchronization when synchronization signals are unavailable.

At 1002, the UE may attempt to obtain a synchronization signal, as described in connection with 912 of FIG. 9. For example, the UE may attempt to obtain a GNSS signal (e.g., the GNSS signal 622), a base station SSB (e.g., the SSB 620), and/or a SyncRef UE SLSS (e.g., the SLSS 624 and/or the SLSS 626).

At 1004, the UE may determine whether a synchronization signal was found. If, at 1004, the UE determines that a synchronization signal was found, then, at 1018, the UE may perform an initial synchronization using the synchronization signal, as described in connection with 602 of FIG. 6A.

If, at 1004, the UE was unable to find a synchronization signal, then, at 1006, the UE searches for a PSCCH, as described in connection with 918 of FIG. 9. For example, at 1008, the UE may obtain a timing synchronization, as described in connection with 920 of FIG. 9. For example, the UE may attempt to obtain symbol boundaries and/or subframe boundaries. At 1010, the UE may obtain a frequency synchronization, as described in connection with 922 of FIG. 9. For example, the UE may attempt to obtain a subchannel and/or a frequency offset.

In some examples, the UE may search for a PSCCH based on correlation with DMRS. For example, the UE may compute a correlation with signals and DMRS locations to determine pairs (n, i) of subframes and PSCCH DMRS locations with strong correlation. The UE may then use the pairs (n, i) to determine, at 1012, if there is PSCCH. In other examples, the UE may search for a PSCCH based on energy measurements. For example, the UE may perform energy measurements on symbols in a subframe and compare differences in the measurements to determine, at 1012, if there is PSCCH.

If, at 1012, the UE determines that there is no PSCCH, then control returns to 1006 to continue searching for PSCCH. If, at 1012, the UE determines that there is PSCCH, then, at 1014, the UE decodes the PSCCH. For example, the UE may decode the PSCCH to obtain SCI, as described in connection with 604 of FIG. 6A.

At 1016, the UE may perform timing and frequency synchronization tracking over time. For example, the UE may track the timing synchronization (e.g., the symbol boundary and/or the subframe boundary) and the frequency synchronization (e.g., the subchannel and frequency offset) over time based on additional PSCCH receptions.

Figure 11:
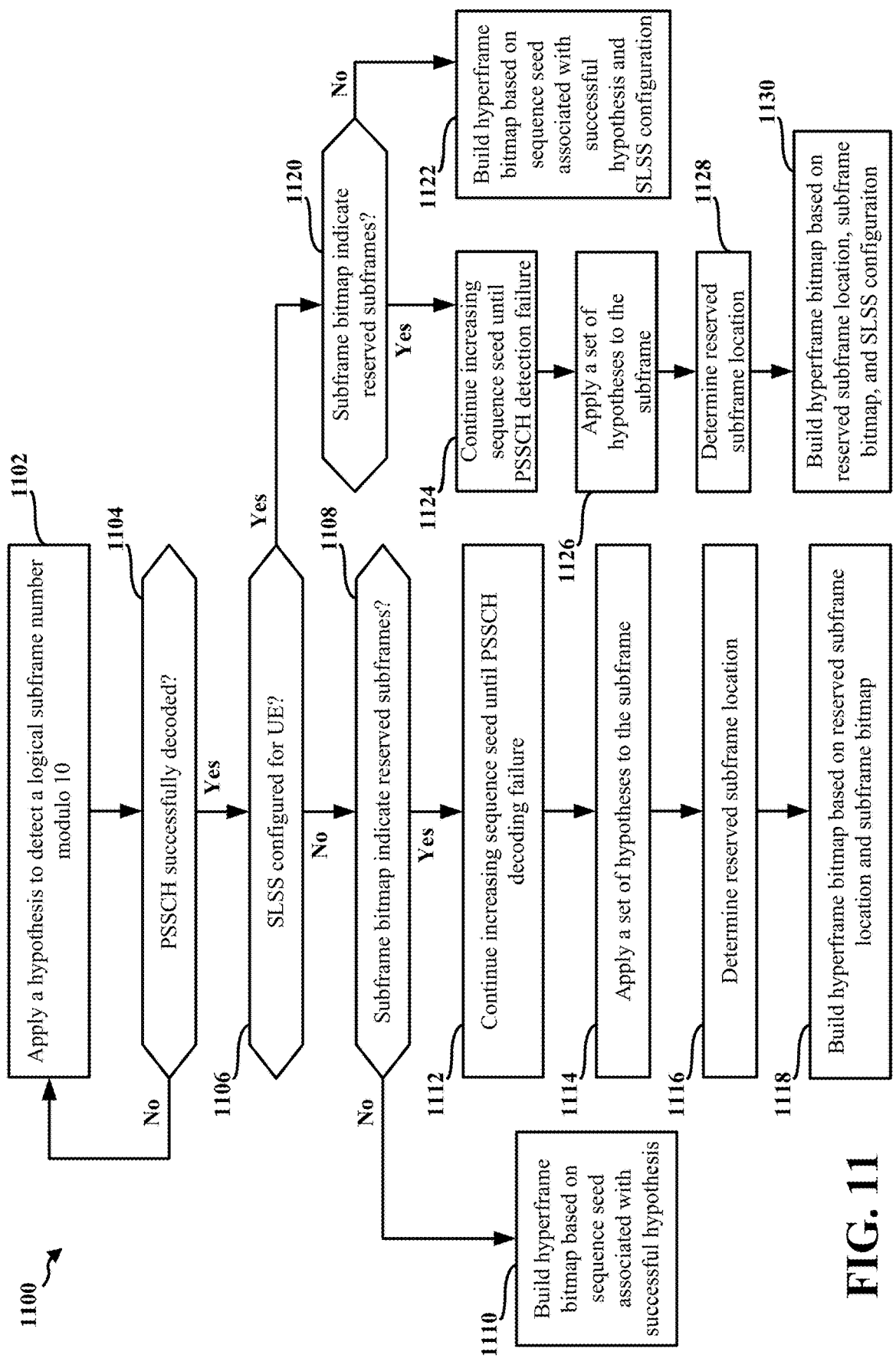
FIG. 11 is a flowchart of a method of wireless communication at a UE, in accordance with the teachings disclosed herein.

FIG. 11 is a flowchart 1100 of a method of wireless communication. The method may be performed by a UE (e.g., a receiving sidelink UE, such as the UE 104, the second wireless communication device 350, and/or an apparatus 1302 of FIG. 13). The method may facilitate searching for PSCCH while performing autonomous synchronization, which may improve communication performance by maintaining synchronization when synchronization signals are unavailable.

At 1102, the UE applies a hypothesis to detect a logical subframe number, as described in connection with 926 of FIG. 9. For example, based on a successfully decoded PSCCH, the UE may identify a logical subframe containing PSSCH associated with the PSCCH. The UE may apply one of ten k mod 10 values to determine whether the PSSCH may be decoded. For example, successfully decoding PSSCH may include applying a scrambling sequence and a DMRS sequence, which may each be generated based on a sequence seed (e.g., a k mod 10 value).

At 1104, the UE determines whether the PSSCH is successfully decoded. For example, the UE may determine that the PSSCH is successfully decoded when a sequence seed to decode and demodulate the PSSCH and the CRC for the PSSCH is successful. If, at 1104, the UE determines that decoding the PSSCH was unsuccessful, then control returns to 1102 to apply another hypothesis. For example, the UE may increase the value of the sequence seed by one.

If, at 1104, the UE determines that the PSSCH was successfully decoded, then, at 1106, the UE may determine whether SLSS is configured for the UE. If, at 1106, SLSS is not configured for the UE (e.g., the UE is not configured to receive SLSS), then, at 1108, the UE determines whether the subframe bitmap indicates whether the hyperframe includes reserved subframes. For example, if the subframe bitmap is of length 16 bits or 20 bits, then the hyperframe does not include reserved subframes. However, if the subframe bitmap is of length 100 bits, then the hyperframe includes reserved subframes.

If, at 1108, the UE determines that the subframe bitmap indicates that the hyperframe does not include reserved subframes (e.g., a subframe bitmap of length 16 bits or 20 bits), then, at 1110, the UE builds a hyperframe bitmap based on the sequence seed associated with the successful hypothesis and the subframe bitmap.

If, at 1108, the UE determines that the subframe bitmap indicates that the hyperframe includes reserved subframes (e.g., a subframe bitmap of length 100 bits), then, at 1112, the UE continues increasing the value of the sequence seed until the UE detects PSSCH decoding failure. For example, when the subframe bitmap is of length 100 bits, the hyperframe includes 40 reserved subframes located with a periodicity of 256 subframes. The UE may detect the PSSCH decoding failure based on applying a sequence seed based on the initial sequence seed (e.g., at 1102), but which may be out of synchronization based on a reserved subframe. At 1114, the UE may apply a set of hypotheses to the subframe until the PSSCH is successfully decoded. At 1116, the UE may determine the location of the reserved subframe. For example, the UE may determine the location of the reserved subframe based on a difference in the expected sequence seed value and the correct sequence seed value for the subsequent PSSCH. At 1118, the UE may build a hyperframe bitmap based on the reserved subframe location and the subframe bitmap, as described in connection with 930 of FIG. 9.

Returning to 1106, if the UE is configured to receive SLSS, then, at 1120, the UE determines whether the subframe bitmap indicates reserved subframes. If, at 1120, the UE determines that the subframe bitmap indicates that the hyperframe does not include reserved subframes (e.g., the subframe bitmap is of length 16 bits or 20 bits), then, at 1122, the UE builds a hyperframe bitmap based on the sequence seed associated with the successful hypothesis, the subframe bitmap, and the SLSS configuration.

If, at 1120, the UE determines that the subframe bitmap indicates that the hyperframe includes reserved subframes (e.g., the subframe bitmap is of length 100 bits), then, at 1124, the UE continues increasing the value of the sequence seed until the UE detects PSSCH decoding failure. The UE may detect the PSSCH decoding failure based on applying a sequence seed based on the initial sequence seed (e.g., at 1102), but which may be out of synchronization based on a reserved subframe. At 1126, the UE may apply a set of hypotheses to the subframe until the PSSCH is successfully decoded. At 1128, the UE may determine the location of the reserved subframe. For example, the UE may determine the location of the reserved subframe based on a difference in the expected sequence seed value and the correct sequence seed value for the subsequent PSSCH. At 1130, the UE may build a hyperframe bitmap based on the reserved subframe location, the subframe bitmap, and the SLSS configuration, as described in connection with 930 of FIG. 9.

Figure 12B:
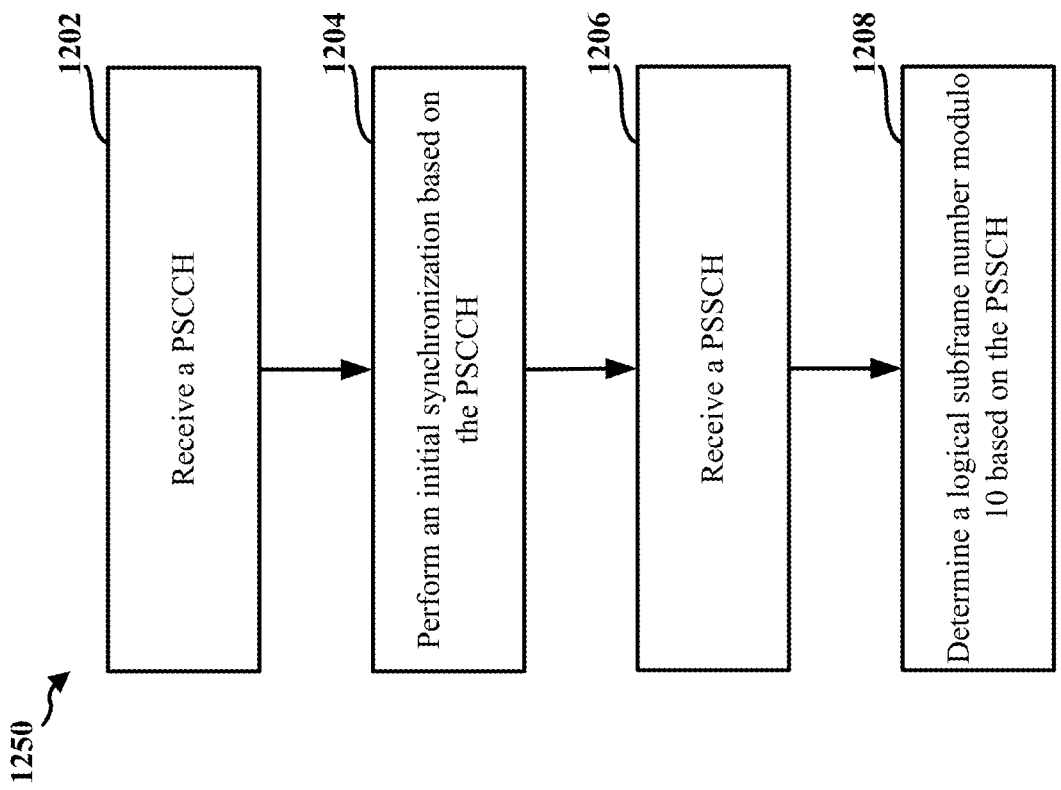
FIG. 12B is a flowchart of a method of wireless communication at a UE, in accordance with the teachings disclosed herein.
Figure 12A:
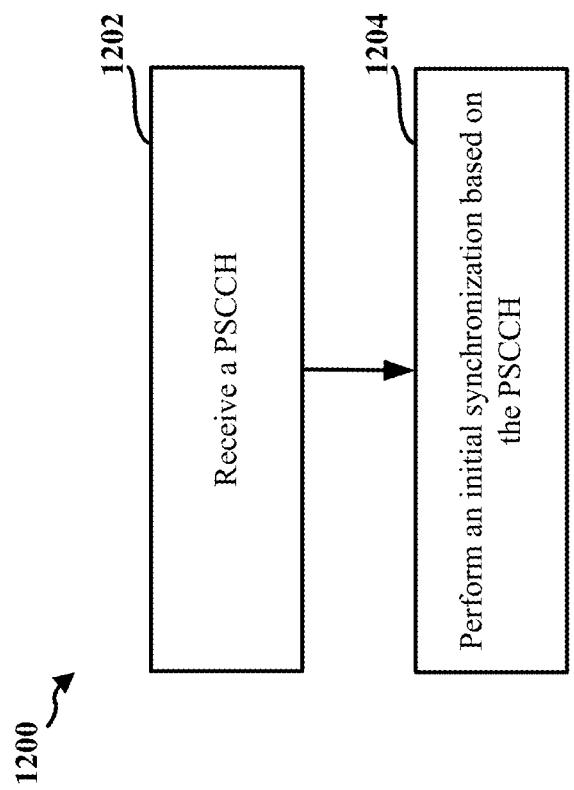
FIG. 12A is a flowchart of a method of wireless communication at a UE, in accordance with the teachings disclosed herein.

FIG. 12A is a flowchart 1200 of a method of wireless communication. The method may be performed by a UE (e.g., a receiving sidelink UE, such as the UE 104, the second wireless communication device 350, and/or an apparatus 1302 of FIG. 13). The method may facilitate performing autonomous synchronization, which may improve communication performance by maintaining synchronization when synchronization signals are unavailable.

At 1202, the UE receives a PSCCH, as described in connection with the PSCCH 914 of FIG. 9. For example, 1202 may be performed by a PSCCH component 1340 of the apparatus 1302 of FIG. 13.

At 1204, the UE performs an initial synchronization based on the PSCCH, as described in connection with 920 and 922 of FIG. 9, and 1008 and 1010 of FIG. 10. For example, 1204 may be performed by an initial synchronization component 1342 of the apparatus 1302 of FIG. 13.

In some examples, performing the initial synchronization may include obtaining a timing synchronization based on a DMRS in the PSCCH, as described in connection with 920 of FIGS. 9 and/or 1008 of FIG. 10. For example, the timing synchronization may include determining a symbol boundary and a subframe boundary that is based on a known PSCCH DMRS sequence and based on a set of frequency hypotheses. For example, after determining that a received signal includes PSCCH DMRS, the UE may perform correlations for the received signal across the different configured subchannels to determine the subframe boundary and the symbol boundaries. In some examples, the UE may also obtain a frequency synchronization associated with the PSCCH based on at least one frequency hypothesis of the set of frequency hypotheses, as described in connection with 922 of FIGS. 9 and/or 1010 of FIG. 10. For example, the UE may apply the multiple frequency hypotheses to determine a frequency offset associated with a subchannel. In some examples the UE may decode the PSCCH after performing the initial synchronization based on the DMRS, as described in connection with 924 of FIGS. 9 and/or 1014 of FIG. 10. In some examples, the UE may also perform at least one of time tracking or frequency tracking based on reception of an additional PSCCH after obtaining an initial timing synchronization and frequency offset based on the PSCCH, as described in connection with 1016 of FIG. 10.

In some examples, the UE may perform the initial synchronization based on the PSCCH when a synchronization signal is unavailable to the UE, as described in connection with 912 and 918 of FIGS. 9 and/or 1002, 1004, and 1006 of FIG. 10. For example, a GNSS signal and/or a base station SSB may be unavailable to the UE. In some examples, the UE may perform the initial synchronization when SLSS is not configured for the UE. For example, the UE may not be configured to receive SLSS. In other examples, the UE may be configured to receive SLSS, but may not receive any SLSS.

FIG. 12B is a flowchart 1250 of a method of wireless communication. The method may be performed by a UE (e.g., a receiving sidelink UE, such as the UE 104, the second wireless communication device 350, and/or an apparatus 1302 of FIG. 13). The method may facilitate performing autonomous synchronization, which may improve communication performance by maintaining synchronization when synchronization signals are unavailable.

As shown in FIG. 12B, the method may include receiving a PSCCH, as described in connection with 1202, and performing an initial synchronization based on the PSSCH, as described in connection with 1204.

At 1206, the UE may receive a PSSCH, as described in connection with the PSSCH 916 of FIG. 9. For example, 1206 may be performed by a PSSCH component 1344 of the apparatus 1302 of FIG. 13.

At 1208, the UE may determine a logical subframe number modulo 10 based on the PSSCH, as described in connection with 928 of FIGS. 9 and/or 1102 of FIG. 11. For example, 1208 may be performed by a logical number component 1346 of the apparatus 1302 of FIG. 13.

In some examples, determining the logical subframe number modulo 10 may include comparing the PSSCH to a set of hypotheses for the logical subframe number modulo 10, and identifying the logical subframe number modulo 10 based on a successful CRC for the PSSCH. In some examples, the set of hypotheses may be based on different bitmap lengths. In some examples, the UE may also include unsuccessfully decoding a second PSSCH based on the logical subframe number modulo 10, comparing the second PSSCH to a second set of hypotheses for a second logical subframe number modulo 10, and identifying the second logical subframe number modulo 10 based on a successful CRC for the second PSSCH. The UE may also identify a location of a reserved subframe based on the logical subframe number modulo 10 and the second logical subframe number modulo 10. In some examples, the UE may build a bitmap of a hyperframe based on the location of the reserved subframe, as described in connection with 930 of FIG. 9, and/or 1110, 1118, 1122, or 1130 of FIG. 11.

Figure 13:
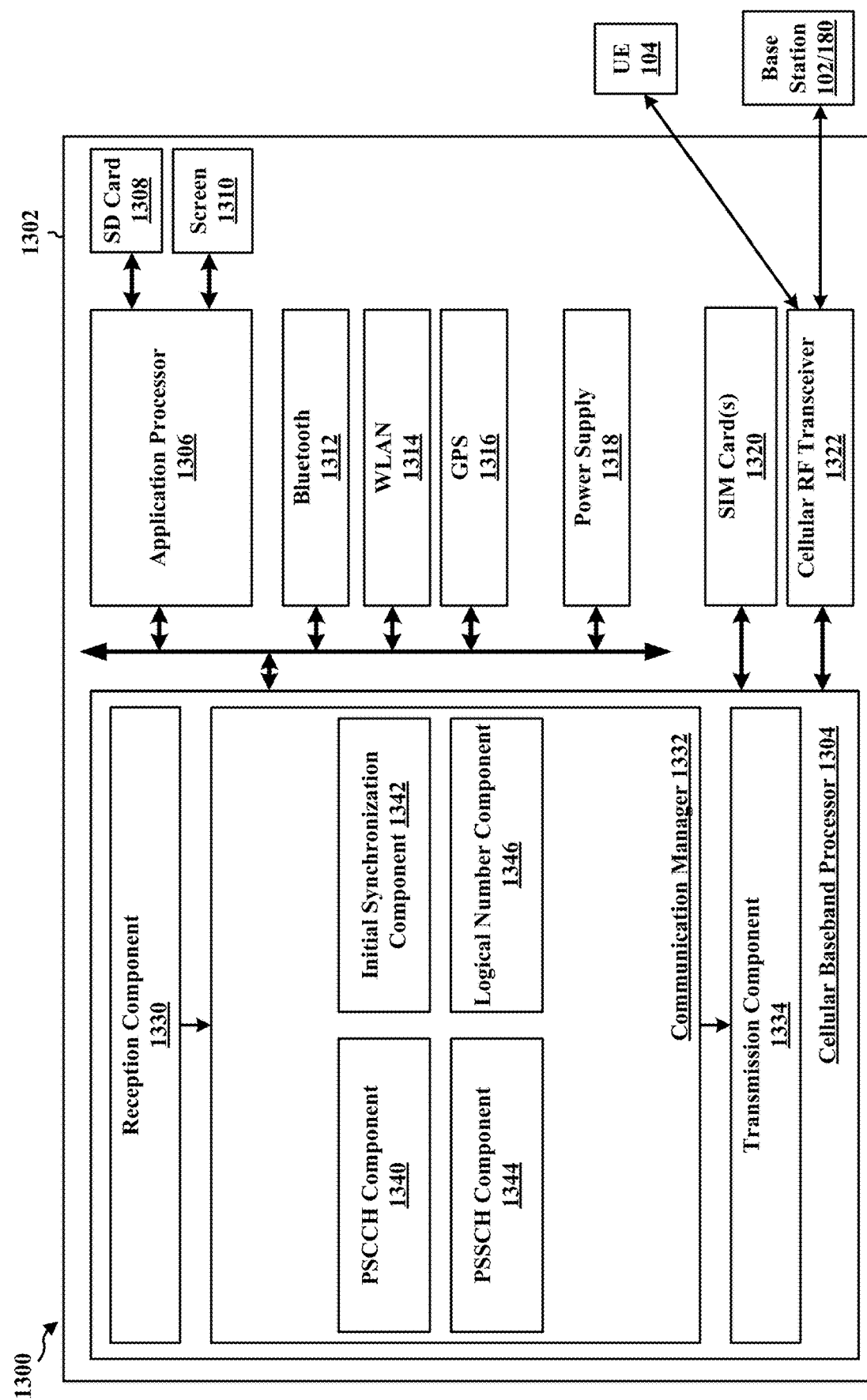
FIG. 13 is a diagram illustrating an example of a hardware implementation for an example apparatus, in accordance with the teachings disclosed herein.

FIG. 13 is a diagram 1300 illustrating an example of a hardware implementation for an apparatus 1302. The apparatus 1302 may be a UE, or another device configured to transmit and/or receive sidelink communication. The apparatus 1302 includes a baseband processor 1304 (also referred to as a modem) coupled to a RF transceiver 1322. In some aspects, the baseband processor 1304 may be a cellular baseband processor and/or the RF transceiver 1322 may be a cellular RF transceiver. The apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and/or a power supply 1318. The baseband processor 1304 communicates through the RF transceiver 1322 with the UE 104 and/or the base station 102/180. The baseband processor 1304 may include a computer-readable medium/memory. The computer-readable medium/memory may be non-transitory. The baseband processor 1304 is responsible for general processing, including the execution of software stored on the computer-readable medium/memory. The software, when executed by the baseband processor 1304, causes the baseband processor 1304 to perform the various functions described in the present application. The computer-readable medium/memory may also be used for storing data that is manipulated by the baseband processor 1304 when executing software. The baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband processor 1304. The baseband processor 1304 may be a component of the second wireless communication device 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see the second wireless communication device 350 of FIG. 3) and include the additional modules of the apparatus 1302.

The communication manager 1332 includes a PSCCH component 1340 that is configured to receive a PSCCH, for example, as described in connection with 1006 of FIG. 10, and/or 1202 of FIGS. 12A and/or 12B.

The communication manager 1332 also includes an initial synchronization component 1342 that is configured to perform an initial synchronization based on the PSCCH, for example, as described in connection with 1008 and/or 1010 of FIG. 10, and/or 1204 of FIGS. 12A and/or 12B.

The communication manager 1332 also includes a PSSCH component 1344 that is configured to receive a PSSCH, for example, as described in connection with 1102 and 1104 of FIG. 11, and/or 1206 of FIG. 12B.

The communication manager 1332 also includes a logical number component 1346 that is configured to determine a logical subframe number modulo 10 based on the PSSCH, for example, as described in connection with 1102, 1114, and/or 1126 of FIG. 11, and/or 1208 of FIG. 12B.

The apparatus may include additional components that perform each of the blocks of the algorithm in the flowcharts of FIGS. 9, 10, 11, 12A, and/or 12B. As such, each block in the flowcharts of FIGS. 9, 10, 11, 12A, and/or 12B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband processor 1304, includes means for receiving a PSCCH. The example apparatus 1302 also includes means for performing an initial synchronization based on the PSCCH.

In another configuration, the example apparatus 1302 also includes means for obtaining a timing synchronization based on a DMRS in the PSCCH.

In another configuration, the example apparatus 1302 also includes means for obtaining a frequency synchronization based on at least one frequency hypothesis of the set of frequency hypotheses.

In another configuration, the example apparatus 1302 also includes means for decoding the PSCCH after performing the initial synchronization based on the DMRS.

In another configuration, the example apparatus 1302 also includes means for performing at least one of time tracking or frequency tracking based on reception of an additional PSCCH after obtaining an initial timing synchronization and frequency offset based on the PSCCH.

In another configuration, the example apparatus 1302 also includes means for receiving a PSSCH. The example apparatus 1302 also includes means for determining a logical subframe number modulo 10 based on the PSSCH.

In another configuration, the example apparatus 1302 also includes means for comparing the PSSCH to a set of hypotheses for the logical subframe number modulo 10. The example apparatus 1302 also includes means for identifying the logical subframe number modulo 10 based on a successful CRC for the PSSCH.

In another configuration, the example apparatus 1302 also includes means for unsuccessfully decoding a second PSSCH based on the logical subframe number modulo 10. The example apparatus 1302 also includes means for comparing the second PSSCH to a second set of hypotheses for a second logical subframe number modulo 10. The example apparatus 1302 also includes means for identifying the second logical subframe number modulo 10 based on a successful CRC for the second PSSCH. The example apparatus 1302 also includes means for identifying a location of a reserved subframe based on the logical subframe number modulo 10 and the second logical subframe number modulo 10. The example apparatus 1302 also includes means for building a bitmap of a hyperframe based on the location of the reserved subframe.

The means may be one or more of the components of the apparatus 1302 configured to perform the functions recited by the means. As described supra, the apparatus 1302 may include the TX processor 368, the RX processor 356, and the controller/processor 359. As such, in one configuration, the means may be the TX processor 368, the RX processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including memory and at least one processor coupled to the memory and configured to, based at least in part on information stored in the memory: receive a PSCCH; and perform an initial synchronization based on the PSCCH.

Aspect 2 is the apparatus of aspect 1, further including that to perform the initial synchronization, the memory and the at least one processor are configured to: obtain a timing synchronization based on a DMRS in the PSCCH.

Aspect 3 is the apparatus of any of aspects 1 and 2, further including that the timing synchronization is with a symbol boundary and a subframe boundary based on a known PSCCH DMRS sequence and based on a set of frequency hypotheses.

Aspect 4 is the apparatus of any of aspects 1 to 3, further including that the memory and the at least one processor are configured to: obtain a frequency synchronization based on at least one frequency hypothesis of the set of frequency hypotheses.

Aspect 5 is the apparatus of any of aspects 1 to 4, further including that a first amount of frequency hypotheses of the set of frequency hypotheses corresponds to a second amount of configured subchannels.

Aspect 6 is the apparatus of any of aspects 1 to 5, further including that the memory and the at least one processor are configured to: decode the PSCCH after performing the initial synchronization based on the DMRS.

Aspect 7 is the apparatus of any of aspects 1 to 6, further including that the memory and the at least one processor are configured to: perform at least one of time tracking or frequency tracking based on reception of an additional PSCCH after obtaining an initial timing synchronization and frequency offset based on the PSCCH.

Aspect 8 is the apparatus of any of aspects 1 to 7, further including that the memory and the at least one processor are configured to: receive a PSSCH; and determine a logical subframe number modulo 10 based on the PSSCH.

Aspect 9 is the apparatus of any of aspects 1 to 8, further including that to determine the logical subframe number modulo 10, the memory and the at least one processor are configured to: compare the PSSCH to a set of hypotheses for the logical subframe number modulo 10; and identify the logical subframe number modulo 10 based on a successful CRC for the PSSCH.

Aspect 10 is the apparatus of any of aspects 1 to 9, further including that the set of hypotheses are based on different bitmap lengths.

Aspect 11 is the apparatus of any of aspects 1 to 10, further including that the memory and the at least one processor are configured to: unsuccessfully decode a second PSSCH based on the logical subframe number modulo 10; compare the second PSSCH to a second set of hypotheses for a second logical subframe number modulo 10; and identify the second logical subframe number modulo 10 based on a successful CRC for the second PSSCH.

Aspect 12 is the apparatus of any of aspects 1 to 11, further including that the memory and the at least one processor are configured to: identify a location of a reserved subframe based on the logical subframe number modulo 10 and the second logical subframe number modulo 10.

Aspect 13 is the apparatus of any of aspects 1 to 12, further including that the memory and the at least one processor are configured to: build a bitmap of a hyperframe based on the location of the reserved subframe.

Aspect 14 is the apparatus of any of aspects 1 to 13, further including that the UE performs the initial synchronization based on the PSCCH when a synchronization signal is unavailable.

Aspect 15 is the apparatus of any of aspects 1 to 14, further including that an SLSS is not configured for the UE.

In aspect 16, the apparatus of aspect 1 further includes at least one antenna coupled to the at least one processor.

In aspect 17, the apparatus of aspect 1 or 16 further includes a transceiver coupled to the at least one processor.

Aspect 18 is a method of wireless communication for implementing any of aspects 1 to 15.

Aspect 19 is an apparatus for wireless communication including means for implementing any of aspects 1 to 15.

In aspect 20, the apparatus of aspect 19 further includes at least one antenna coupled to the means to perform the method of any of aspects 1 to 15.

In aspect 21, the apparatus of aspect 19 or 20 further includes a transceiver coupled to the means to perform the method of any of aspects 1 to 15.

Aspect 22 is a non-transitory computer-readable storage medium storing computer executable code, where the code, when executed, causes a processor to implement any of aspects 1 to 15.

What is claimed is:

1. An apparatus for wireless communication at a user equipment (UE), comprising:
   memory; and
   at least one processor coupled to the memory and configured to, based at least in part on information stored in the memory:
      receive a physical sidelink control channel (PSCCH);
      perform an initial synchronization based on the PSCCH;
      receive a physical sidelink shared channel (PSSCH); and
      determine a logical subframe number modulo 10 based on the PSCCH.

2. The apparatus of claim 1, wherein to perform the initial synchronization, the memory and the at least one processor are configured to:
   obtain a timing synchronization based on a demodulation reference signal (DMRS) in the PSCCH.

3. The apparatus of claim 2, wherein the memory and the at least one processor are configured to:
   decode the PSCCH after performing the initial synchronization based on the DMRS.

4. The apparatus of claim 1, wherein to determine the logical subframe number modulo 10, the memory and the at least one processor are configured to:
   compare the PSSCH to a set of hypotheses for the logical subframe number modulo 10; and
   identify the logical subframe number modulo 10 based on a successful cyclic redundancy check (CRC) for the PSSCH.

5. The apparatus of claim 4, wherein the memory and the at least one processor are configured to:
   unsuccessfully decode a second PSSCH based on the logical subframe number modulo 10;
   compare the second PSSCH to a second set of hypotheses for a second logical subframe number modulo 10; and
   identify the second logical subframe number modulo 10 based on a successful CRC for the second PSSCH.

6. The apparatus of claim 5, wherein the memory and the at least one processor are configured to:
   identify a location of a reserved subframe based on the logical subframe number modulo 10 and the second logical subframe number modulo 10.

7. The apparatus of claim 6, wherein the memory and the at least one processor are configured to:
   build a bitmap of a hyperframe based on the location of the reserved subframe.

8. The apparatus of claim 1, wherein the UE performs the initial synchronization based on the PSCCH when a synchronization signal is unavailable.

9. The apparatus of claim 8, wherein a sidelink synchronization signal (SLSS) is not configured for the UE.

10. The apparatus of claim 1, further comprising a transceiver coupled to the at least one processor.

11. An apparatus for wireless communication at a user equipment (UE), comprising:
    memory; and
    at least one processor coupled to the memory and configured to, based at least in part on information stored in the memory:
       receive a physical sidelink control channel (PSCCH); and
       perform an initial synchronization based on the PSCCH, wherein to perform the initial synchronization, the memory and the at least one processor are configured to:
       obtain a timing synchronization based on a demodulation reference signal (DMRS) in the PSCCH, wherein the timing synchronization is with a symbol boundary and a subframe boundary based on a known PSCCH DMRS sequence and based on a set of frequency hypotheses.

12. The apparatus of claim 11, wherein the memory and the at least one processor are configured to:
    obtain a frequency synchronization based on at least one frequency hypothesis of the set of frequency hypotheses.

13. An apparatus for wireless communication at a user equipment (UE), comprising:
memory; and
at least one processor coupled to the memory and configured to, based at least in part on information stored in the memory:
receive a physical sidelink control channel (PSCCH);
perform an initial synchronization based on the PSCCH; and
perform at least one of time tracking or frequency tracking based on reception of an additional PSCCH after obtaining an initial timing synchronization and frequency offset based on the PSCCH.

14. A method of wireless communication at a user equipment (UE), comprising:
receiving a physical sidelink control channel (PSCCH);
performing an initial synchronization based on the PSCCH;
receiving a physical sidelink shared channel (PSSCH); and
determining a logical subframe number modulo 10 based on the PSSCH.

15. The method of claim 14, wherein performing the initial synchronization includes:
obtaining a timing synchronization based on a demodulation reference signal (DMRS) in the PSCCH.

16. The method of claim 15, further comprising:
decoding the PSCCH after performing the initial synchronization based on the DMRS.

17. The method of claim 14, wherein determining the logical subframe number modulo 10 includes:
comparing the PSSCH to a set of hypotheses for the logical subframe number modulo 10; and
identifying the logical subframe number modulo 10 based on a successful cyclic redundancy check (CRC) for the PSSCH.

18. The method of claim 17, wherein the set of hypotheses are based on different bitmap lengths.

19. The method of claim 17, further comprising:
unsuccessfully decoding a second PSSCH based on the logical subframe number modulo 10;
comparing the second PSSCH to a second set of hypotheses for a second logical subframe number modulo 10; and
identifying the second logical subframe number modulo 10 based on a successful CRC for the second PSSCH.

20. The method of claim 19, further comprising:
identifying a location of a reserved subframe based on the logical subframe number modulo 10 and the second logical subframe number modulo 10.

21. The method of claim 20, further comprising:
building a bitmap of a hyperframe based on the location of the reserved subframe.

22. The method of claim 14, wherein the UE performs the initial synchronization based on the PSCCH when a synchronization signal is unavailable.

23. The method of claim 22, wherein a sidelink synchronization signal (SLSS) is not configured for the UE.

24. A method of wireless communication at a user equipment (UE), comprising:
receiving a physical sidelink control channel (PSCCH); and
performing an initial synchronization based on the PSCCH, wherein performing the initial synchronization includes:
obtaining a timing synchronization based on a demodulation reference signal (DMRS) in the PSCCH, wherein the timing synchronization is with a symbol boundary and a subframe boundary based on a known PSCCH DMRS sequence and based on a set of frequency hypotheses.

25. The method of claim 24, further comprising:
obtaining a frequency synchronization based on at least one frequency hypothesis of the set of frequency hypotheses.

26. The method of claim 25, wherein a first amount of frequency hypotheses of the set of frequency hypotheses corresponds to a second amount of configured subchannels.

27. A method of wireless communication at a user equipment (UE), comprising:
receiving a physical sidelink control channel (PSCCH);
performing an initial synchronization based on the PSCCH; and
performing at least one of time tracking or frequency tracking based on reception of an additional PSCCH after obtaining an initial timing synchronization and frequency offset based on the PSCCH.

* * * * *